(12) United States Patent
Felman

(10) Patent No.: US 11,792,485 B2
(45) Date of Patent: *Oct. 17, 2023

(54) SYSTEMS AND METHODS FOR ANNOTATING VIDEO MEDIA WITH SHARED, TIME-SYNCHRONIZED, PERSONAL REACTIONS

(71) Applicant: Hillel Felman, Lake Hiawatha, NJ (US)

(72) Inventor: Hillel Felman, Lake Hiawatha, NJ (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/568,944

(22) Filed: Jan. 5, 2022

(65) Prior Publication Data
US 2022/0132214 A1 Apr. 28, 2022

Related U.S. Application Data

(63) Continuation-in-part of application No. 17/358,981, filed on Jun. 25, 2021, now Pat. No. 11,259,075, which is a continuation-in-part of application No. 16/231,754, filed on Dec. 24, 2018, now Pat. No. 11,082,463.

(60) Provisional application No. 62/670,973, filed on May 14, 2018, provisional application No. 62/609,707, filed on Dec. 22, 2017.

(51) Int. Cl.
| | | |
|---|---|---|
| *G06F 15/16* | (2006.01) | |
| *H04N 21/4788* | (2011.01) | |
| *H04N 21/43* | (2011.01) | |
| *H04N 21/25* | (2011.01) | |
| *H04N 21/466* | (2011.01) | |
| *H04N 21/258* | (2011.01) | |
| *H04N 21/442* | (2011.01) | |

(52) U.S. Cl.
CPC ....... *H04N 21/4788* (2013.01); *H04N 21/251* (2013.01); *H04N 21/25883* (2013.01); *H04N 21/4307* (2013.01); *H04N 21/44226* (2020.08); *H04N 21/4668* (2013.01)

(58) Field of Classification Search
CPC .......................... H04N 21/4788; H04N 21/252
See application file for complete search history.

(56) References Cited

U.S. PATENT DOCUMENTS

| | | | | |
|---|---|---|---|---|
| 8,296,380 B1 * | 10/2012 | Kelly | .................... | H04L 51/216 709/224 |
| 8,996,625 B1 * | 3/2015 | Singleton | .................. | H04L 9/40 707/771 |
| 9,767,087 B1 * | 9/2017 | Petrov | .................... | H04N 21/84 |
| 10,325,629 B1 * | 6/2019 | Cunico | .................... | G06F 18/00 |

(Continued)

*Primary Examiner* — Hieu T Hoang
(74) *Attorney, Agent, or Firm* — Stephen E. Zweig

(57) ABSTRACT

A system and method for sharing personal information, such as user comments on defined video media is described, wherein a server may receive and classify user information from a user. The server may further track user interactions between the user and one or more other users. The server may share certain user information classified as disclosure information with the one or more other users upon determining that a disclosure condition has been met. The server may also transmit one or more notifications relating to such disclosure. Thus, different users may search for various types of viewing partners (selected according to various parameters), and share text, audio, or video comments on the same video media, such as movies or television shows, either in real time, or on a non-real time basis.

20 Claims, 4 Drawing Sheets

Combined set of user reactions for video media "X"

(56) References Cited

U.S. PATENT DOCUMENTS

| | | | |
|---|---|---|---|
| 10,575,045 B1* | 2/2020 | Kruse | H04N 21/2393 |
| 11,176,484 B1* | 11/2021 | Dorner | G06F 16/738 |
| 2001/0051958 A1* | 12/2001 | deVries | G06F 16/78 |
| | | | 707/E17.108 |
| 2007/0260601 A1* | 11/2007 | Thompson | G06F 16/9535 |
| | | | 707/999.005 |
| 2009/0087160 A1* | 4/2009 | Lui | G11B 27/034 |
| | | | 386/282 |
| 2010/0251295 A1* | 9/2010 | Amento | G11B 27/322 |
| | | | 725/38 |
| 2011/0119694 A1* | 5/2011 | Roberts | H04L 63/104 |
| | | | 725/87 |
| 2012/0143948 A1* | 6/2012 | Archambault | G06Q 10/0631 |
| | | | 709/204 |
| 2013/0046761 A1* | 2/2013 | Soderberg | G06F 16/48 |
| | | | 707/736 |
| 2013/0060873 A1* | 3/2013 | Gautam | G06Q 10/107 |
| | | | 709/206 |
| 2013/0080348 A1* | 3/2013 | Pantaliano | G06Q 30/02 |
| | | | 705/347 |
| 2013/0215279 A1* | 8/2013 | Rivas-Micoud | H04N 17/00 |
| | | | 348/180 |
| 2014/0068399 A1* | 3/2014 | Mori | G06F 16/335 |
| | | | 715/201 |
| 2014/0172848 A1* | 6/2014 | Koukoumidis | G06F 16/78 |
| | | | 707/736 |
| 2014/0195930 A1* | 7/2014 | Rajagopal | H04L 65/403 |
| | | | 715/753 |
| 2014/0215512 A1* | 7/2014 | Maruyama | H04N 21/2743 |
| | | | 725/34 |
| 2015/0026260 A1* | 1/2015 | Worthley | G06F 16/958 |
| | | | 709/204 |
| 2015/0035959 A1* | 2/2015 | Amble | A61B 5/0077 |
| | | | 348/74 |
| 2015/0046537 A1* | 2/2015 | Rakib | G11B 27/34 |
| | | | 709/204 |
| 2015/0139610 A1* | 5/2015 | Syed | G11B 27/34 |
| | | | 386/241 |
| 2015/0261853 A1* | 9/2015 | Shao | G06F 16/248 |
| | | | 707/722 |
| 2016/0027318 A1* | 1/2016 | Rao | G09B 5/06 |
| | | | 434/309 |
| 2017/0004139 A1* | 1/2017 | Wong | G09B 5/02 |
| 2017/0229152 A1* | 8/2017 | Loganathan | G06F 16/735 |
| 2018/0176661 A1* | 6/2018 | Varndell | H04N 21/2187 |
| 2019/0044988 A1* | 2/2019 | Oesterreicher | H04N 21/4788 |
| 2020/0327378 A1* | 10/2020 | Smith | G06N 5/048 |
| 2021/0011967 A1* | 1/2021 | Rathod | G06F 16/9535 |
| 2021/0287274 A1* | 9/2021 | Nguyen | G06N 3/04 |
| 2022/0353220 A1* | 11/2022 | Balaji | H04L 51/10 |

* cited by examiner

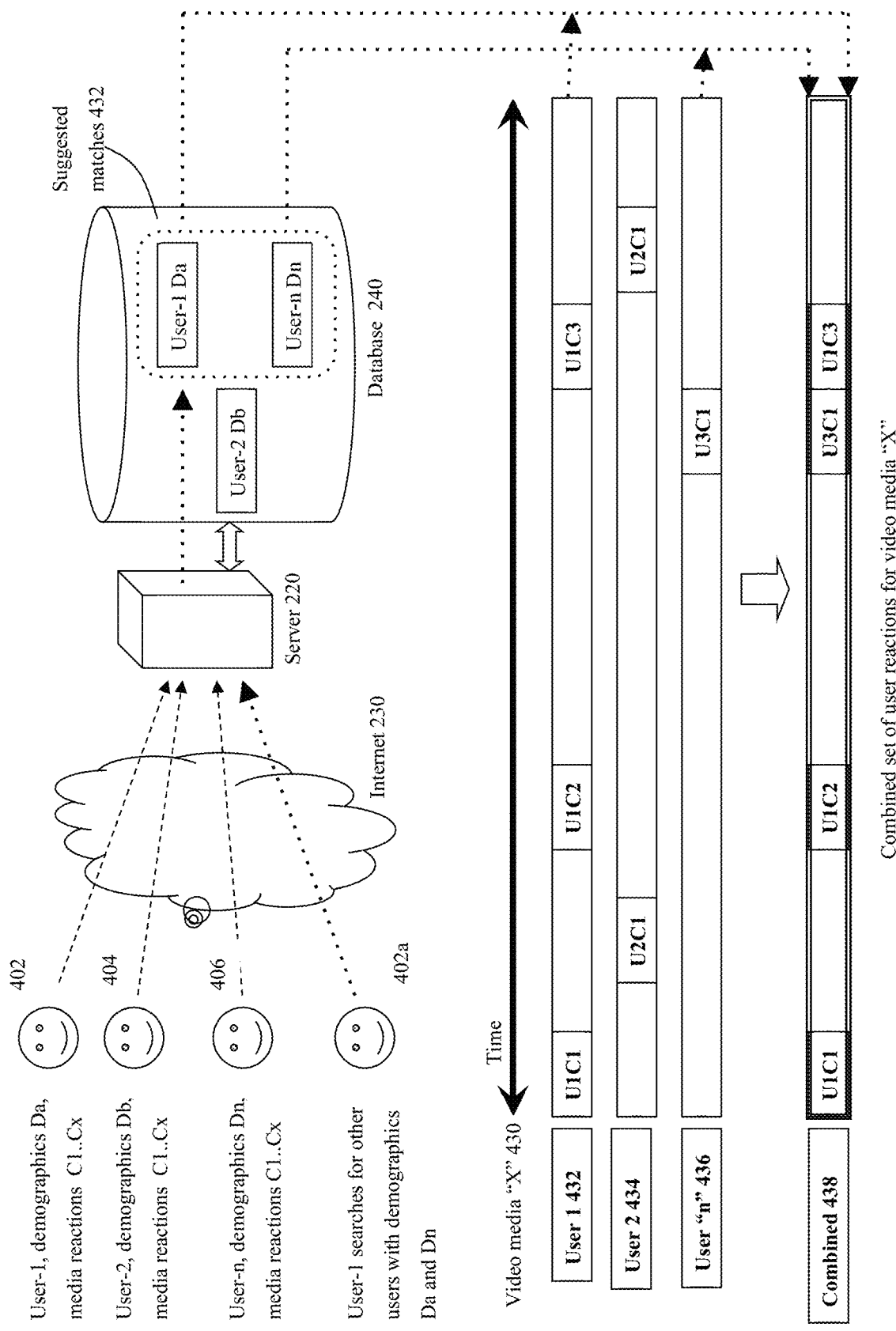

SYSTEMS AND METHODS FOR ANNOTATING VIDEO MEDIA WITH SHARED, TIME-SYNCHRONIZED, PERSONAL REACTIONS

CROSS-REFERENCE TO RELATED APPLICATIONS

The present application is a continuation in part of U.S. patent application Ser. No. 17/358,981, filed Jun. 25, 2021; application Ser. No. 17/358,981 was a continuation in part of U.S. patent application Ser. No. 16/231,754, filed Dec. 24, 2018, application Ser. No. 16/231,754 claimed the benefit of U.S. provisional patent application Ser. No. 62/609,707, titled "Systems and Methods for Sharing Personal Information," filed Dec. 22, 2017 and U.S. provisional patent application Ser. No. 62/670,973, titled "Systems and Methods for Sharing Personal Information," filed May 14, 2018, the contents of all of these applications are incorporated by reference herein in their entirety.

BACKGROUND OF THE INVENTION

Field of the Invention

This specification relates generally to applications for sharing information with others. More specifically, this specification relates to applications that allow users to connect, interact and share various personal information with one another, based on customizable events and/or filters.

Description of the Related Art

Self-disclosure and reciprocity are essential factors in forming relationships. When one person discloses personal information to another, the recipient is more likely to provide their own personal information in return. Indeed, studies have shown that individuals who are prone to share personal information with others during a first encounter establish long-term relationships on a more consistent basis than individuals who are more hesitant to disclose personal information.

As online interactions assume an ever-growing part of most people's daily lives, online relationships now supplement or even supplant offline relationships. According to a recent survey, forty percent of smartphone users access social networks daily, and more than half of such users believe the time they spend interacting with people through social media is as valuable as the time they spend together in person. The increasing ubiquity of online interactions is reflected by the plethora of chat forums, social networks, messaging applications, and other applications facilitating online interactions and meetings.

Unfortunately, such applications fail to model real-world interactions, where people engage in activities together, make real-time observations, and disclose personal information to one another at their own pace and according to their own comfort level. These applications either require a user to remain entirely anonymous or require users to disclose all personal information specified by the application on a one-time, upfront basis. Moreover, currently available social networking and messaging applications do not adequately assist users in avoiding befriending bad actors and often lack functionality to allow a user to build trust and rapport with other users over time.

The current inability of social networking and messaging applications to emulate real-world information disclosures and to facilitate information exchange often results in a low level of emotional connectedness among users. In one study, fifty-eight women engaged with friends through various mediums, including in-person meetings, video messaging, audio conversations, and text-only messaging. While bonding occurred across all mediums, the level of such bonding differed significantly, with the highest level of bonding occurring during in-person interactions, followed by video chat, audio chat, and lastly, text-only messaging.

Even for individuals who are eager to forge online connections with others, the process of doing so is significantly time- and energy-consuming, often requiring users to check, read and respond to multiple messages. Despite the fact that perceived similarity has proven the most significant factor in developing positive online relationships, current social networking and messaging applications fail to assist online users in discovering their similarities with other users. Moreover, current social networking and messaging applications fail to create situations that emulate real-world meetings and interactions, and fail to allow for users to gauge for social attraction, or "liking"—a significant factor in offline relationships.

Accordingly, there remains a need in the art for applications that allow users to easily disclose various personal information to others, while maintaining granular control of such disclosures. It would be beneficial if such applications allowed for personal information to be disclosed in a streamlined and automated way, based on various conditions relating to timing, similarities between users and/or interactions between users. It would be further beneficial if such applications allowed users to engage with each other in ways that strongly emulate real-world meetings and interactions.

About SRT files: SRT files (SubRip Subtitle files) are commonly used in the video and motion picture industry to add subtitles and the timing of the subtitles to video. They are commonly named .srt files. Typically, these files are human readable text files. In some embodiments, the internet equivalent of srt files is WebVTT. It is the World Wide Web Consortium's standard for displaying timed text in synchronization or connection with the HTML5 <track> element, may also be used.

Movie viewing in groups: It is known that viewing movies in groups can have a significant effect on human well-being. See, for example, Dziura, S., Merchant, J. S., Alkire, D., Rashid, A., Shariq, D., Moraczewski, D., & Redcay, E. (2021). Effects of social and emotional context on neural activation and synchrony during movie viewing.

BRIEF SUMMARY OF THE INVENTION

In some embodiments, the invention may be an online system and method for creating a searchable database of user comments and other reactions to video media. According to the video media playback time, the various reactions, which can include comments, are time-synchronized, and the users are also described according to their demographics and other parameters. Thus, the system enables users to create custom annotated video media with other users of their choice.

The success of certain television programs, such as Mystery Science Theatre 3000, attests to the fact that there is a desire to recreate the type of environment where friends or even strangers can gather together, watch a video event, and talk to each other during the event. Unfortunately, given the fact that friends and family are often separated from each other, it is difficult to create these events in real life. The invention is inspired, in part, by the insight that it would be desirable to create computer systems that can enable such events, even when it is impossible for all event participants to participate at the same time. Such a system must be able to work on a non-real time basis, and must enable the users to pick and choose which other users would be joined to create a mutually commented video viewing experience.

Although conventional search engines, such as Google, can allow users to search for comments and ratings on various types of video media, such comments and ratings are usually not time synchronized to the video media. Although YouTube allows users to comment on video media (such as games) in a time synchronized manner (such as during play), and upload the video media and these comments, this prior art is again limiting. This prior art doesn't allow comments from a variety of different users, commenting at different times, to be selectively combined to create a group viewing experience.

The invention was inspired, in part, by concept that it what is needed is an online computer system focused on providing a searchable database of time-synchronized user comments and other reactions to various types of video media. Such a system should ideally also provide additional tools to enable users to have editing control over the resulting group viewing experience for any given set of video media and given set of commenting or reacting users. In other words, what is needed is a system where user comments and reactions, produced at different times, can be time synchronized according to the given video media in question. This system would allow users to create custom annotated events with other users of their choice.

The system is further inspired, in part, by the insight that user verbal or written comments in response to a given video media are only a subset of the greater set of possible user reactions to the given video media. Users may also make gestures or other types of body motions, change physiological status (e.g., start crying in response to a sad movie), smoke or burn incense, or even belch, make razzberries noises and/or emit other types rude noises. Thus, in this disclosure, often the term "reaction" will be used, which will include user comments, but which can also include user motion, user physiological status changes, data pertaining to the user's environment while viewing the movie (e.g., user environmental data), and the like. This data can also be captured by suitable sensors, and reproduced either directly, or by verbal or written summaries of the data. Here, for example, if a first user burns incense, the system need not reproduce the incense smell at a second user's location, but can at least report: "burns incense candle".

Similarly, if a first user starts crying, this can be detected by suitable cameras and vision recognition systems, and reported to a second user in the form of a crying avatar, or written: "user 1 starts crying" message.

In some embodiments, the users may also draw doodles or sketches while watching the video media, and these user generated images can also be captured by video cameras or other suitable equipment as yet another type of user reaction. Here, user sketch capture systems such as the FingerWorks Telestrator apps, which enable watch party members to draw overlays on videos or other images, may be used.

In accordance with the foregoing objectives and others, exemplary applications, methods and systems are disclosed herein for automated disclosure of personal information based on customizable rules and/or filters. Exemplary embodiments of the application may allow users to: find and interact with other users, provide information to other users via an automated information disclosure process, and/or review user information associated with such other users.

Exemplary applications may streamline the process of disclosing and/or receiving personal information to/from others. Rather than drafting messages and engaging in lengthy online conversations, users may rely on the application to automatically send/receive personal information. For example, users may customize the application to set the type(s) of information to be disclosed, users to whom such information may be provided, when (and in what order) such information should be disclosed and/or any number of conditions upon which such information should be disclosed. Accordingly, the application may allow a user to efficiently and safely establish an online or offline relationship with other users.

In one embodiment, a method for facilitating user information disclosure is provided. The method may include receiving user information relating to a first user and associating a disclosure condition with the user information. The method may also include determining that a disclosure condition has been met (e.g., when the first user interacts with a second user, when the first user is determined to be similar in some way to the second user, and/or upon expiration of a predetermined time period). Upon such determination, the user information may then be shared with the second user. The method may further include notifying the first user that the condition was met and that the user information was shared.

In another embodiment, a system is provided that includes one or more computers and one or more storage devices storing instructions that, when executed by the one or more computers, cause the one or more computers to perform operations for disclosing user information. The operations performed may include receiving user information relating to a first user and associating a disclosure condition with the user information. The operations performed may also include determining that a disclosure condition has been met and, upon such determination, sharing the disclosure information with a second user. The operations performed may further include notifying the first user and/or the second user that the condition was met and that the disclosure information was shared.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows an example of the how the invention can annotate certain specific video media with user comments and reactions.

DETAILED DESCRIPTION OF THE INVENTION

Nomenclature

Figure 1:
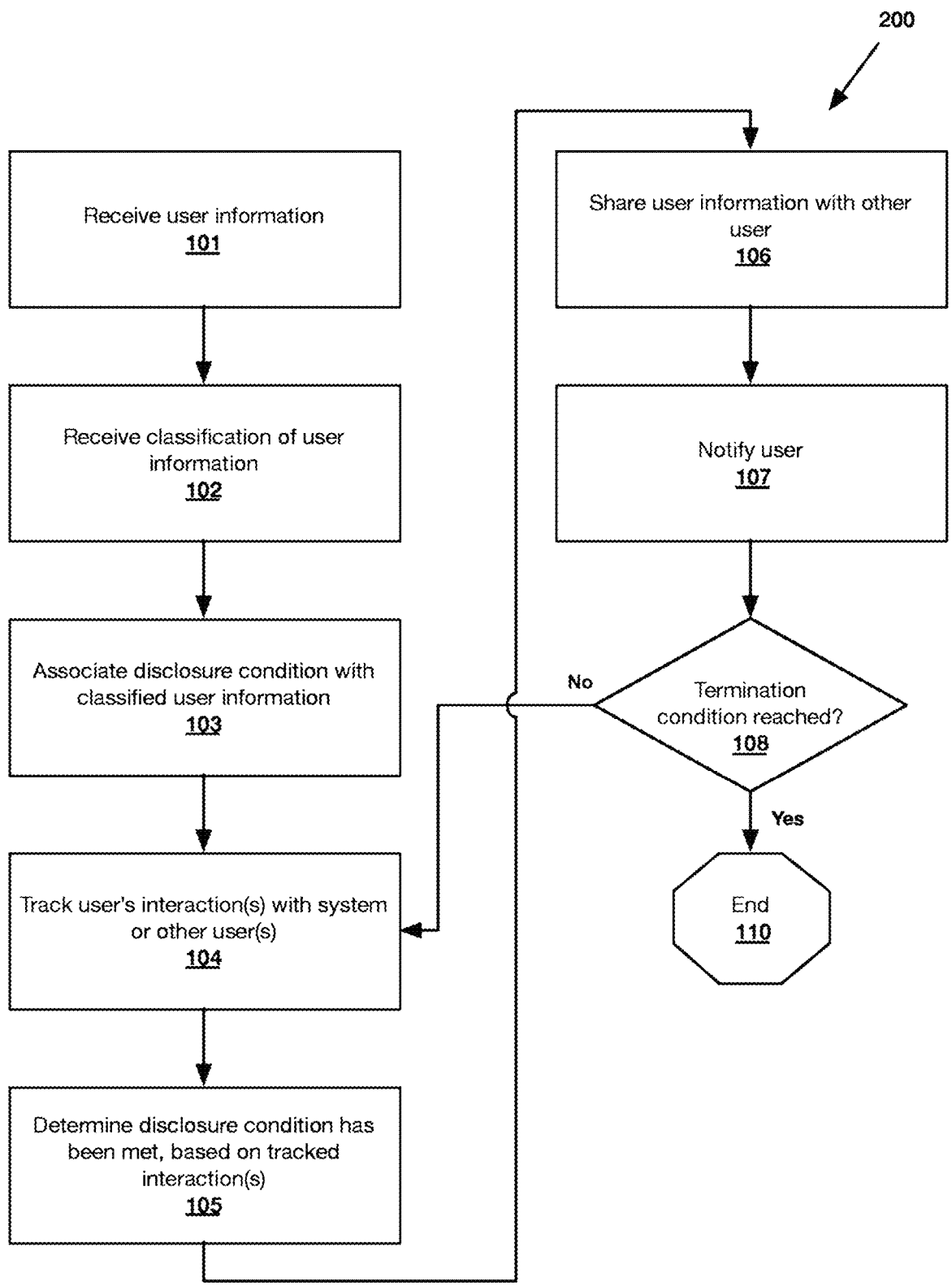
FIG. 1 shows an exemplary method 100 according to an embodiment.

Although, as previously discussed, SRT (SubRip Text) files are more commonly considered to be formatted lines of text and timecodes, in this disclosure, the concept of an SRT file is generalized. Here, this more general form of an SRT file is extended to include time annotated text files, audio files, and video files. Thus, according to this disclosure, this more general type of SRT file may have audio or audiovisual annotations, as well as text annotation (subtitle). According to this extension of the concept, a .srt file would be designated a "text" SRT file, and the term SRT, used without modification, would also include the possibility of audio or video annotations as well. Thus, a text SRT file would have subtitle information, an audio SRT file would have voice over or under information, and a video SRT file would have timed video insertion information. For example, if a narrator provides narration of a video using video SRT files, then according to the definition, the system would insert, into the video in question, video clips from the video SRT file according to their various time annotations.

Thus, according to the specification, a generalized SRT file (also termed a GSRT or gsrt) file (usually just expressed in the claims as an SRT file) would comprise a computer file comprising: a video link, and a plurality of time-stamped commentary. Each time stamped commentary can comprise any of text, audio, or video information, as well as other information. For example, in the context where the GSRT file is used to capture multiple users interacting in a real or virtual environment (such as a watch party), this other information may include ambient lighting, ambient acoustics, or even more exotic data such as tactile sensations or smells. Thus, a GSRT file, for example of a real or virtual event taking place in a stadium may include ambient acoustic information to modify (e.g., add echoes) to the audio information, in order to create a more immersive experience. In some embodiments, the commentary can also include commenter identification. If present, this commenter identification will associate the commentary with the identity of a particular commenter, which may be a user of the system, a narrator, or other entity. Each individual commentary item is associated with a girt time stamps, thus in turn corresponds to a time location in the video associated with the video link. This is thus an extension of the SubRip Text format, extended to include information other than text, and the possibility of more than one identified commenter. In general, unless otherwise specified, all discussion of SRT files in this disclosure should be construed to be referring to generalized or GSRT files.

Various applications, systems and methods are disclosed herein that allow users to progressively disclose their user information to one or more other users. Exemplary embodiments may receive user information relating to a user and associate the same with the user's account. The described embodiments may further allow users to search for, interact with, and/or engage in an information disclosure process with one another. Various aspects of the information disclosure process may be customizable and/or automated, such as: initiation of the disclosure process, the timing of information disclosure(s), the order of such disclosure(s), any number of disclosure conditions relating to various user information, recipients of disclosed information and/or termination of the disclosure process.

In one embodiment, the application may be a standalone application, such as a social network application. In such embodiments, the application may provide various features, including but not limited to: messaging features, searching features, subscription features, posting features, group features, polling and/or voting features, favoriting features, news and status feed features and/or others. Such features may be provided via, for example, chat forums, videos, virtual reality ("VR") programs, video games that simulate real-world interactions (e.g., buying a drink together at a bar, walking in a park, reading books in a café, etc.), audio files, articles, links, groups, automatic recommendations, etc.

In other embodiments, the application may interface with, connect to, or otherwise extend the functionality of other sites or applications. For example, embodiments of the application may interface with conventional social networking sites, such as FACEBOOK, TWITTER, or INSTAGRAM. As another example, embodiments of the application may integrate with chat forums and other commenting applications (e.g., QUORA, DISQUS, MEDIUM or REDDIT) and/or may integrate with messaging applications (e.g., FACEBOOK MESSENGER, WECHAT, WHATSAPP, GROUPME, etc.). And, as yet another example, embodiments of the application may integrate with online video game platforms (e.g., TWITCH, STEAM, etc.) to provide an information overlay user interface.

In one embodiment, a user who attempts to access an exemplary information disclosure system (e.g., via an information disclosure application) may be requested to login to an existing account or register a new account during a registration process. The registration process may request information from the user, such as a name, password, address, payment information, email address, alias, and/or other relevant information. Such information may be entered by a user or may be automatically populated from any number of connected systems. If the information disclosure system is implemented as a plugin, extension or add-on to another application (e.g., marketplace, video game platform, or social network), registration may be unnecessary due to pre-authentication and identification of the user.

In one embodiment, the information disclosure system may allow users to create multiple accounts (e.g., a primary account and any number of secondary accounts) and/or multiple identities associated with a single account. In such embodiments, the system may allow for secondary accounts to be associated with the same identity as the primary account, an identity that differs from that of the primary account, and/or no identity (i.e., anonymous secondary accounts).

As an example, a user may wish to use the application to share their thoughts on various topics with others. The user may create a primary account to share political reactions/comments with their friends on political message boards and have such reactions/comments attributed to the user's primary identity. The same user may also create a secondary account (e.g., an anonymous secondary account) to anonymously share reactions/comments on marijuana legalization. Accordingly, secondary accounts may be used for "single-blind disclosures" (i.e., where information is disclosed between one anonymous user and one identified user) and/or for "double-blind disclosures" (i.e., where two users disclose information to each other while still remaining anonymous).

Other shared thoughts may comprise personal reactions/comments on video media, in particular shared video media such as movies, television shows, video games, interactive movies, virtual reality, video of sports, entertainment events, political rallies, and the like.

It will be appreciated that the identity associated with a given secondary account may be changed, as required or desired by the user. Taking the above example, the user may change the anonymous secondary account to be associated with his true identity or even a different identity. The system may allow for such account identity associations to be manually updated and/or automatically updated based on any number of disclosure conditions (discussed in detail below). As one specific example, identity changes/updates may be based on a comment tagging system wherein the user indexes or tags reactions/comments by some qualitative aspect (e.g., on a scale of 1 to 10, controversial, personal, public, group-specific, trivial, relationship-related, career-related, family-related, etc.).

Upon creating an account (or otherwise registering), the user may sign into the application. In certain embodiments, the user may provide a username and password to login. In other embodiments, the user may employ a connected third-party authentication application to login.

Referring to FIG. 1, an exemplary information disclosure method according to an embodiment is illustrated. As shown, the method begins at step 101 where user information is received via manual entry by a user and/or automatically from a connected third-party system.

The system may employ received user information in order to create a user profile for each user of the application, where each profile comprises some or all of the user information associated with a given user. In one embodiment, a profile creation interface may be displayed to each user in order to collect user information. Such interface may comprise, for example, various forms, surveys and/or questionnaires into which a user may input and/or upload user information. The profile creation interface may be displayed to new users during the registration process and/or may be accessed by registered users via one or more links or buttons.

User information may generally comprise text, images, videos, audio files and/or combinations thereof. Exemplary user information may include, but is not limited to: identification information (e.g., name, username, password, user ID, etc.); contact information (e.g., email, mailing address, phone number, social media accounts, etc.); media (e.g., images, videos, audio files, etc.); scheduling information (e.g., scheduled and/or available times for in-person meetings, audio chats, video chat, messaging chats, etc.); billing and account information (e.g., credit card or other payment information, billing address, points or online "currency" associated with the user's account, etc.); educational information (e.g., schools attended, degree obtained, location, years of attendance, etc.); employment information (e.g., company, position, start and end dates, colleagues, skills, etc.); family information (e.g., living or deceased parents, siblings, and/or other immediate or distant relatives, etc.); demographic information (e.g., height, weight, age, gender, eye color, hair color, ethnicity, religion, etc.); location information (e.g., current location determined via real-time GPS geolocation or reverse geolocation, historical locations, birthplace, current residence, walking or traveling patterns, etc.); physiological or motor-behavior information (e.g., electroencephalogram ("EEG"), electrical potentials from electrodes; precision motion capture and/or 3D tracking systems, holographic information, digital scent information, etc.); medical information (e.g., medical history, medical conditions, medical providers, medication, etc.); social information (e.g., followed users and/or following users, friends, contacts, etc.); preferences and tastes (e.g., likes and dislikes, such as but not limited to, foods, restaurants, user experience with the application, movies, books, other media, persons, groups, places, political/moral views, or things, etc.—including any absolute scale or relativistic system for ranking such likes/dislikes); hashtags; connection preference information (e.g., characteristics desired, not desired, required or prohibited in other users, absolute or relative importance of each characteristic, relationship type desired, etc.); real-time, short-term or long-term strengths, weaknesses and goals (e.g., personal, emotional, physical, professional, etc.); activities, habits and hobbies; ratings information (e.g., ratings received from other users and/or ratings of other users); and/or settings information (e.g., notifications on/off, automatic or third-party recommendations on/off, sound on/off, allow/disallow messages from unconnected users, etc.).

It will be appreciated that user information may include social activities information, such as status updates, reactions/comments, uploads and other postings. Exemplary postings may include, for example, third-party content, user-created content, content relating to the user's real-world or virtual activity, historical content, real-time or live content, and/or any of the above content relating to groups (e.g., groups created by the user and/or groups to which the user belongs).

In one embodiment, the server may authenticate any user information (e.g., information received from a user via manual entry). Such authentication may be completed through an operating system, a network, third-party systems, and/or via trusted third parties vouching for the general accuracy of the user's information.

In one embodiment, the system may employ machine learning and/or artificial intelligence processes (e.g., image or voice recognition technology) to authenticate received user information. For example, the system may employ image recognition to verify that any uploaded images are as described by the user. In some embodiments, such AI methods may be used to automatically detect certain user behaviors during their audio or video reactions/comments and to make such behaviors searchable.

In another embodiments, authentication may additionally or alternatively be completed by another user. For example, a first user may authenticate a second user's physical appearance based on a meeting with the second user. As another example, multiple users may authenticate some or all user information relating to a given user.

It will be appreciated that users may be given the option of connecting and/or interacting only with other users whose profiles have been authenticated. This feature may involve an additional fee, or points to be paid by the user.

Additionally, or alternatively, user information may be automatically determined by the system (e.g., via connection to a third-party system). For example, the system may prompt the user to login to one or more of their social media accounts so that the system may automatically retrieve user information from such accounts. As another example, the system may be connected to a government database and, upon receiving a user's name and/or address, the system may automatically retrieve additional user information from such database.

Once user information is entered into the profile creation interface and/or automatically received by the system, such information may be stored by the system (e.g., in a database). Some or all of the stored user information may also be associated with the user's profile.

At step 102, a classification of the user information is received. Generally, user information associated with a user's account may be automatically and/or manually classified as "private information" (i.e., information that is not to be shared with others); "public information" (i.e., information that is automatically shared with others); or "disclosure information" (i.e., information to be shared with other users via a disclosure processes). As discussed in detail below, disclosure information may be associated with one or more disclosure conditions such that the information may be disclosed to one or more other users during a disclosure process, upon the occurrence of the associated condition.

In certain embodiments, the system may automatically classify some or all user information associated with a user's account as private information, public information, or disclosure information. For example, the system may automatically classify the following information as private information: password, full name, billing information, blocked users, user authentication information, address, social security number, phone number, email address, messages received by the user and/or various user activities, such as user search history. As another example, the system may automatically classify some or all of the following information as public information: username, first name, age, location, followers, followed users, one or more rankings/ratings, and/or photos. The system may display the user's public user information by means of a user profile screen, which may be accessible via a URL or the like.

Additionally, or alternatively, the system may allow users to manually classify user information associated with their profile. For example, in one embodiment, a classification interface may be displayed in order to allow a user to select a classification for some or all of their user information. As discussed in detail below, the classification interface may further allow users to create and/or assign various conditions (i.e., "disclosure conditions") to user information classified as disclosure information such that given disclosure information will be disclosed to one or more other users upon the occurrence of the associated disclosure condition.

At step 103, the system associates a disclosure condition with the user information classified as disclosure information. Generally, disclosure conditions may relate to a user's activity (i.e., activity-based disclosure conditions); any number of dates and/or times (i.e., time-based disclosure conditions); location(s) of the user or other users (i.e., location-based disclosure conditions); user information associated with the user and other users (i.e., user-information-based disclosure conditions); content, keywords or tags associated with the user information (i.e., content-based disclosure conditions); and/or a monetary or point value system (i.e., value-based disclosure conditions). Additionally, or alternatively, disclosure conditions may relate to, or otherwise depend on, one or more other disclosure conditions.

Exemplary user-information-based disclosure conditions may relate to one or more of the following: a user being highly ranked or positively reviewed by other users; a user being highly ranked or positively reviewed by a specific type of user (e.g., by users who are themselves highly ranked or positively reviewed); a user's user information being confirmed by another trusted user and/or authenticated by the system; a user's user information matching a given criterion; and/or two users being associated with at least some similar or identical user information (e.g., a similar interest in a specific activity, overlapping scheduling availability, similar educational information, similar commenting history, a shared favorite website, similar demographic information, and/or similarly rated or ranked digital content, such as a book, movie, music, image, post and/or lists of such content). Other exemplary user-information-based disclosure conditions may relate to specific users or groups of users; a connection existing between users (e.g., two users are connected to another user); and/or a degree of connection between the user and another user.

In order to disclose without actually disclosing, or to be awarded some type of internal exchangeable credits for doing so, metadata of various sorts, such as demographic data, or degree of connection, could be disclosed. In such instances, the disclosure may occur in some cumulative, but anonymous, way.

Exemplary content-based disclosure conditions may relate to words, keywords, symbols, objects, etc. in a post or comment. Such conditions may alternatively or additionally relate to hashtags or other classifications associated with such information. In one embodiment, the system may allow for content-based disclosure conditions to relate to crowd-sourced information. For instance, a particular post or comment submitted by a user may be disclosed to one or more other users upon a crowdsourced determination (e.g., via voting or the like) that the post/comment is popular or of a high quality. To allow for crowdsourced determinations, a user who submits a post or comment may agree to manually or automatically allow the system to disclose certain specific or generic information to other users.

Exemplary time-based disclosure conditions may relate to, for example, a specific date and/or time, and/or predetermined amounts of time (e.g., after a user connects to another user or after a message is sent to/received from another user). In one embodiment, users may set a specific order of disclosure information to be disclosed, specific items of information to be disclosed, specific speeds or rates for items to be disclosed, specific dates and/or times for items to be disclosed, etc. For example, one user may choose to disclose their photo at a first time, then their first name at a second time, and finally, their location at a third time. Another user may choose to, instead, disclose their first name at a first time, then their location at a second time, and finally, their photo at a third time. In another embodiment, users may initially choose an avatar unrepresentative of their physical appearances to represent themselves to each other. Disclosure may then involve replacing parts of the avatar with a digital representation of each user's actual physical features over time.

In certain embodiments, the system may also allow users to account for order of disclosure and/or delays in information disclosure. As an example, a user may specify that, if they are the first to disclose information during an information disclosure process, then their information should be disclosed on a more conservative basis (i.e., longer delays between disclosures) than if both users were simultaneously disclosing information. As another example, a user may also specify that, if they are the second user to disclose information during an information disclosure process, then their information should be disclosed on a more liberal basis (i.e., shorter delays between disclosures) than if both users were simultaneously disclosing information. As yet another example, a user may specify that a short delay in receiving one important piece of information from another user may cause a long delay in disclosing a less important piece of the user's information to the other user. And, as another example, a user may configure the disclosure process to allow for acceleration and/or deceleration in reciprocity of another user's behavior.

Exemplary location-based disclosure conditions may relate to the current or historical location of the user and/or the current or historical location of another user. For example, a disclosure condition may be based on at least one of the users being located (or not being located) in a given area or within a predetermined distance from a given location. As another example, a disclosure condition may be based on a determination that the users are located (or are not located) within a predetermined distance of each other. As yet another example, a disclosure condition may relate to distance-based "rings" or "levels," wherein each level is defined by a range of distances from the user's current location. And, as another example, a disclosure condition may be based on both users having visited (or having not visited) a particular location at some point in the past.

As a specific example, an American college student spending a semester in Paris, France may wish to find other Americans (or, specifically, other American college students) who are currently in Paris. Accordingly, the student may create a disclosure condition to allow disclosure of their user information to other users who are American and who are located within the city of Paris. The student may additionally or alternatively limit disclosure to other such users who have the same or similar disclosure condition(s) associated with their accounts.

With respect to value-based disclosure conditions, in one embodiment, each individual information disclosure may be assigned a number of points that are awarded to the user once they disclose, and the users may trade information based on a certain number of points they are both willing to use. Points may be assigned on the basis of: order of disclosure, timing of disclosure, length of visibility of disclosure, specific information disclosed, whether disclosure is simultaneous or not, the amount of information disclosed, the sensitivity of information disclosed, the rank of a user disclosing or being disclosed information, the other user's ranking of the user disclosing information, how often in the past a specific piece of information is disclosed, whether the information disclosure is reciprocated, who initiated the disclosure process, etc. Points may also be awarded to users on the basis of various user activities, including but not limited to: authenticating another user, meeting another user, creating a profile, ranking another user, providing a recommendation, maintaining a regular presence on the application, creating a post, initiating an information disclosure process, etc.

In one embodiment, a point system may also allow two or more users to agree upon a static or dynamic fair market value for the disclosure of various types of disclosure information. For example, a current country may be worth 25 points, a current city may be worth 50 points, an immediate previous city may be worth 20 points, and a high school may be worth 22 points. In this example, users may simultaneously disclose one or more types of disclosure information having an equal or approximately equal total point value (e.g., 70 points worth of any disclosure information or from about 65 to about 75 points worth of any disclosure information). In other embodiments, however, users may reach an agreement to allow one user to disclose information of a significantly lower or significantly higher value than another user. The users and/or system may then keep track of the disclosure imbalance for future disclosures, or dismiss the imbalance.

It will be appreciated that points may be employed for any number of features in addition to information disclosure. For example, points may be used to access special features of the application, purchase items, join certain groups, participate in chat forums, access websites, read or comment on blogs, contact users, and/or to view users. As discussed above, points may be exchanged among users or may be earned by users upon engaging in various activities.

It will also be appreciated that instead of, or in addition to, utilizing a point system, other forms of bartering value or compensation may be utilized. In certain embodiments, a user may decide to forfeit one or more privileges in order to gain one or more different privileges. For example, a user may gain the privilege of being able to contact another user he normally is unable to contact in exchange for forfeiting the privilege of requiring the contacted user to disclose his identity during an information disclosure process. In another embodiment, a user may gain the privilege of following a set of relaxed disclosure conditions in return for initiating the information disclosure process with another user. In yet another embodiment, compensation in the form of actual currency may be utilized.

Activity-based disclosure conditions may generally relate to social activities associated with a user (i.e., performed by the user or performed by others in relation to the user). Such social activities may include, for example: sending/receiving reactions/comments, messages, reviews, connection requests, and/or user information to/from other users; voting on polls; posting on message boards, pages, other users' "walls" and/or other sites; connecting with other users; and/or reading, favoriting or otherwise interacting with articles and other posts associated with the user. Some specific social activity-based disclosure conditions include: the user disclosing/receiving an amount and/or type of user information; the user disclosing/receiving a predefined number of messages; the user beginning a disclosure process with a certain number or type of other users; the user already having, or adding within a certain time frame, a certain number or type of connections; and/or the user connecting with, or interacting with, another user in a particular way.

Other activity-based disclosure conditions may relate to current or historical digital activities—whether such digital activity occurs within the system or within a connected third-party system. Exemplary digital activities may include, for example, visiting a website, watching a video, listening to a song, playing a video game on a computer or gaming console, purchasing or selling an item through an online marketplace, uploading a digital file, and/or generally using an input device to control a computer (e.g., a mouse, a keyboard, an eye-tracking sensor, a hand-gesture recognition sensor, a facial-gesture recognition sensor, a motion sensor, a body-position recognition sensor and/or an audio input device, such as a microphone).

Yet other activity-based disclosure conditions may relate to current or historical real-world activities associated with a user. Exemplary real-world activities may include, for example, consuming a particular type or amount of food or drink, visiting a given establishment, traveling to a particular location, attending an event, playing a musical instrument, exercising, reading a book and others.

In one embodiment activity-based disclosure conditions may relate to real-world or digital activities that are scheduled to occur at a future time. In such embodiment, a user may keep a schedule or calendar comprising any number of future activities, including times, locations, and/or other participants. And the system may access the schedule in order to determine and analyze activity information.

The system may automatically receive, track and/or determine some or all of the above activities by accessing sensors associated with one or more user devices employed by the user and/or information stored by such user devices. In one embodiment, the system may retrieve stored and/or real-time activity information from one or more user device sensors, including but not limited to: accelerometers, gyroscopes, global positioning system ("GPS") sensors, microphones, cameras, mouse tracking sensors or software, video or playback and/or other input devices and software. In another embodiment, the system may retrieve activity information stored by a user device, such as but not limited to: historical, current and/or scheduled physical location(s) of the user, health and exercise information, website browsing history, social media account information, etc. It will be appreciated that the system may employ machine learning and/or artificial intelligence processes (e.g., image recognition, natural language processing and/or voice recognition technology) to determine activity information and/or predict future activity information.

The system may employ the determined activity information for various purposes. In one embodiment, the system may display historical, current, and/or scheduled activity information to specific users and/or publicly to all users. Such activity information may be displayed via a public profile, notifications (e.g., based on classification and conditions), a mapping interface, a graphical widget present and/or any other disclosure interface present within the application or within a third-party application. As an example, a mapping interface may include a list of users, where information relating to each user in the user list is displayed. Such information may include an image or avatar, a username, a current virtual location of the user (e.g., a website) and/or a historical virtual location of the user (e.g., webpages the user has visited in order to arrive at their current virtual location). As another example, a graphical widget of a disclosure interface may be displayed on a particular webpage, where the widget includes a list of users who are currently viewing the webpage and information associated with such users (e.g., an avatar, a username, any disclosed user information, etc.). In both of the above examples, a user may select a user from the displayed user list to view that user's publicly available profile and/or to send a message to that user (when permitted).

In some embodiments, the system may analyze a user's activity information to discover patterns, understand various information about a relationship between two users or among multiple users (e.g., how two users first became connected, how users typically interact with each other, a "closeness" of a particular connection, etc.), and/or to determine recommendations (e.g., content recommendations or potential connections recommendations (discussed below)). The results of an analysis of a user's activity information be displayed to one or more users and/or may be used in information disclosure processes.

In one embodiment, a user may be required to grant permission before the system tracks certain activity information. Such permission may be global or may be granular such that the user may exclude certain activities (or certain types of activities) from being tracked.

In any event, the application may allow users to create any of the above-described disclosure conditions and/or may provide any number of default disclosure conditions. Accordingly, the user may select or assign such disclosure conditions to each of the disclosure information associated with their account. In one embodiment, the application may allow multiple items of disclosure information to be assigned to a single category or group such that the user may set one or more disclosure conditions for the whole group.

At step 104, the user may interact with the system and/or other users of the system. In one embodiment, the user may be required to "meet," "discover" and/or connect with other users of the system before they may interact or engage in information disclosure with such users. In certain embodiments, users may be required to connect, even if they have actually met one another in person or via a different application. In other embodiments, users may be automatically connected if they are already connected via a different application (e.g., FACEBOOK, TWITTER, TWITCH, etc.). The discovery and/or meeting of other users may be manual or automatic in nature.

In certain embodiments, a user may meet or discover other users by manual means. For example, a user may find another user by entering public information into a search interface searching for certain parameters (e.g., name, commonalities, physical characteristics, traits that one of the users does not possess but finds desirable, etc.). If the entered information matches user information associated with one or more users' accounts, a profile (i.e., a URL) associated with such users may be returned. The searching user may view the returned profiles and/or request to connect with one or more of the returned users.

Users may meet via other additional or alternative means, including but not limited to: profile browsing, introductions by a third party, participating together in an event (e.g., watching and/or reacting to videos, streaming a sports games, playing a video game, etc.), commenting on the same post, etc. As an example, a user may allow other users to view him on camera and show that he is available for interaction while the user is active on the application. As another example, the user may meet another user on a different platform with which the application is integrated, such as: social networks, multiplayer video games, VR games or events, websites, blogs, chat rooms, business forums, etc.

As discussed in detail below, each user may be associated with a particular avatar (e.g., a static or dynamic image or video) that is displayed to other users of the system. For example, a user's avatar may be associated with, and displayed alongside, interactions (e.g., reactions/comments, posts, etc.) taken by the user within the system and/or any third-party system, application or site connected to the system. Accordingly, other users of such sites (and the system) may see the user's avatar and select the same to view the user's profile and/or connect with the user.

In certain embodiments, the system may automatically display or recommend other users (i.e., potential connections) to a user based on various factors, including but not limited to: public information and/or disclosure information associated with the user's profile and the potential connections' profiles (e.g., commonalities in public information and/or disclosure between the users, a high authenticity ranking/rating of the user and/or potential connections, other user rankings/ratings, mutual connections, etc.). In some cases, the system may also display the reason(s) for each recommendation while concealing certain underlying information. It will be appreciated that such potential connections recommendations may be presented to a user and/or withheld from a user depending on both the user's disclosure preferences and the potential connection's disclosure preferences.

As an example, the system may analyze a user's search activity and compare the same to other users' search activities in order to provide one or more potential connection recommendations. Such recommendations may include information relating to the percentage of search activity overlap between the user and each potential connection and/or specific overlapping searches. As another example, the system may recommend a potential connection to a user based on the existence of one or more mutual connections between the user and the potential connection. If the mutual connections allow the system to disclose their identity (in whole or in part), the system may display the allowed information to the user upon making the recommendation.

In one embodiment, the information used in recommending potential connections may be dynamic. For example, the system may recommend users based on the fact that the two users are currently in the same physical location or virtual location (e.g., chat room, webpage, message board, video game world, VR simulation, etc.). In other embodiments, the application may include a lag time such that users are only recommended after they are no longer in each other's physical or virtual vicinity.

Recommendations may also be based on similarities in historical, current or future activities. That is, the system may recommend users based on the fact that the two users are, were, or will be engaged in the same (or a similar) activity (e.g., cooking, eating, watching particular content, listening to particular audio, visiting a specific website, etc.).

The system may additionally or alternatively provide content recommendations to users. Such content recommendations may relate to one or more of the following: websites, blogs, articles, links, videos, movies, television shows, songs, images, games, books, etc. As with potential connection recommendations, content recommendations may be based on any user information associated with a user's account and any information associated with the recommended content.

In one particular embodiment, content recommendations may be based on crowdsourced information. For example, a particular content item may be recommended upon a crowdsourced determination that the content is popular or of a high quality (e.g., via voting or the like).

In any event, once a first user has connected with a second user, the two users may interact with each other and such interactions may be tracked by the system 104. Generally, users may interact with each other according to any of the social, digital and/or real-world activities discussed above. Some examples of such activities include: following another user; joining another user's network; manually or automatically disclosing/receiving disclosure information to/from another user; calling or video chatting with another user; watching videos with another user; listening to audio with another user; browsing websites with another user; playing games with another user; viewing or reacting to another user's social activities; and/or selling/purchasing digital or physical products to/from another user.

In one embodiment, the system may provide an interface to allow users to exchange messages with one another. Such messages may comprise any format, including one or more of: text, audio, images and/or video. The form of messaging may be a messaging application provided by the system, through ordinary means of hidden email addresses (e.g., a type of mailing system within the system, a hidden address mailing, etc.). The system may provide automatic translation features to allow users to interact with each other in different languages (e.g., in real time or near real time).

It will be appreciated that, in certain embodiments, users may not exercise equal control of, nor contribute equally to, a shared experience. Rather, the shared experience may be controlled by the system, by one user, or by a percentage of users out of a group. In one such embodiment, a participant user may interact with a host user by joining the host's digital event or activity (e.g., a chat room or a video game). In this embodiment, the host user may utilize a hosting interface provided by the application to facilitate the digital activity and to allow the participant user to join the activity. The hosting interface may allow the host user to view certain aspects of the participant user's user information during the digital activity and, potentially, after the digital activity.

At step 105, the system determines that a disclosure condition associated with a user's disclosure information has been met, based on the tracked user activities and/or interactions. And at step 106, the system then shares the user's disclosure information with another user.

As discussed above, the initiation and progression of the information disclosure process may be automated, manual, or may include both manual and automatic components. In one embodiment, the application may include an information disclosure interface which is adapted to provide, transmit or otherwise display at least (1) a first user's user information to a second user and (2) the second user's user information to the first user. It will be appreciated that the information disclosure interface may allow a user to disclose their user information to a single user (e.g., on a personal, one-on-one basis) and/or to multiple users (similar to group messaging).

The information disclosure interface may be similar to (or integrated with) the above-described messaging interface, and may be a standalone application or may be integrated with other applications. Accordingly, the information disclosure interface may allow for information disclosure to take place along with other user interactions, such as the social, digital and/or real-world activities discussed above.

The information disclosure interface allows for simultaneous or sequential disclosure of user information, depending on relevant disclosure conditions. For example, in one embodiment, the disclosure interface may allow users to release the same piece(s) of disclosure information simultaneously, after a predetermined amount of time. In some embodiments, the system may request confirmation from the user in advance of any disclosures, and users may have the option of overriding previously determined settings.

The information disclosure interface may be overlaid on top of another application and/or integrated into another application such that two or more users may use the disclosure interface while participating together in a real-time, digital activity, such as playing a video game, participating in a VR experience (e.g., a simulation of a real-world experience), listening to music, watching a movie or collaborating on a document. The interface may display a list of users who are currently participating in the digital activity along with any associated disclosure information that is, or that has been, disclosed according to a disclosure process. Thus, the information disclosure interface may comprise any of an audio or video overlay of a given (target) video while that video is playing on one or more video display screens.

In one embodiment, a user's disclosure information may comprise one or more avatars that may be displayed in the list of users. Such avatars may comprise, for example, a live video feed (e.g., from a user's webcam), a recorded video, a photo (e.g., a photo of the user) and/or another digital icon, figure or image. In one particular embodiment, each avatar may be representative of a respective user's physical appearance. That is, a user's avatar may comprise various features that correspond to the user's physical features, such as height, weight, hair, smell, voice, eyes, nose, chin, jaw, lips, eyebrows, forehead, cheekbones, limbs, gait and/or walk.

A user's avatar(s) may generally be shown in the list of users and/or may be incorporated into the application. For example, the avatars may be arranged in rows corresponding to the degree of connection to respective users, such as first-degree connections in a first row, second-degree connections in a second row, etc. As another example, the user avatars may be arranged in a border displayed around an application. As yet another example, the avatars may be located within a virtual environment representing a real-world place (e.g., a lounge, bleachers, a gallery, etc.) and the avatars may be adapted to dynamically mirror the respective user's real-world movements and/or facial expressions.

It will be appreciated that the particular information displayed for a certain user will depend on the user's disclosure conditions. For example, if a user's profile includes a live video feed avatar and a static image avatar, the static image avatar may be displayed before a disclosure process begins. Then, upon fulfillment of a specified disclosure condition, the static image avatar may be replaced with the live video feed avatar.

Similarly, aspects of a user's avatar may be concealed or distorted unless and until various disclosure conditions are fulfilled. That is, the various features of the avatar may be shown, hidden or otherwise manipulated, as dictated by a disclosure process. For example, the entire avatar may be replaced with an icon, blurred, cropped, filtered or otherwise hidden before a disclosure process begins. And, as the disclosure process proceeds, various features of the avatar may be shown until the entire avatar is made available.

It will be appreciated that, as a result of varying levels of disclosure and varying connections amongst the users, what a first user may view of a second avatar (and any other disclosure information) may differ from what a third user in the same group may view of the second user's avatar (and any other disclosure information). Indeed, the users displayed to the first user may also vary from the users displayed to the second user, based on the respective user's specified disclosure condition(s).

In one embodiment, the disclosure interface may allow users to record, store and share their activity with others. Based on a user's disclosure settings, such recordings may include information relating to any content consumed during a given activity, any user information disclosed by the user during the session, communications transmitted/received to/by the user during the session, engagement information, session date/time, session length, etc. In terms of matching interactional preferences, each of the following may be employed as mutual disclosure conditions: a limit on the degree of interaction set by a user (e.g., a number of characters of interaction per given time period), permission to store questions, and/or permission to record session.

In cases where an activity is associated with particular content (e.g., watching a movie) the recording may be synchronized to the content (e.g., such as in a SRT file). For example, a given recording may include video of a particular person watching a movie, wherein the video is equivalently synchronized to the movie.

The disclosure interface may provide a list of available recordings such that a user may select one or more of such recordings to display in their disclosure interface. That is, each of the recordings may serve as a track that may be viewed in the disclosure interface when a user is consuming content. In this way the interface allows a user to feel like he is watching a movie with others, even when no other users are online (i.e., a theater experience could be recreated where the window on the viewing screen showing the movie is surrounded by windows showing other faces and their expressions as they watched).

In certain embodiments, the disclosure interface may be adapted to track, determine and/or analyze various activity information relating to interactions among users. For example, the interface may measure or determine information about a user's engagement with one or more of the displayed users (e.g., real-time users or recorded users). Such engagement information may include eye contact, facial and other micro-expressions, hand or body movements, voice volume, voice tone, attention level, emotional state, mood, physiological indicators such as heart rate, blood pressure and/or others.

The system may employ engagement information in many ways. In one embodiment, the system may notify a first user when a second user is determined to have shown an interest the first user. For example, a first user may be notified when a second user looks at their displayed profile for a certain amount of time.

In another embodiment, the system may analyze engagement information relative to a corresponding conversation between two users to determine and record important conversational events. The system may parse the content of a conversation to inform a user when they are being boring, distressing, interesting, or exciting to their conversational counterpart (e.g., in real time or near real time). Additionally, or alternatively, the system may employ such information to suggest relevant follow up messages and/or to recommend additional users to one or both of the conversation participants.

In order not to be too scrutinizing and forbidding, the system may alternatively act only as a warning system or it might slightly lower its accuracy by including an artificial randomizer or estimation factor. Additionally, or alternatively, the system may record direct and/or indirect and superficial, interactional events. As opposed to a conversational event, these might include, simply being at the same site at the same time, or who else was at that site at that time, or browsing together, even when no direct conversation between the parties transpired. In addition, by allowing the system to access browsing histories, as a type of metadata, it may recommend based on people sharing common sites in interest (e.g., number, duration of visit, etc.), and/or based on their actually having been at the same site at the same time, or within a certain band of time. For instance, two people could be recommended if: they watch the same news program every night even though they watch it six hours apart; they always watch highly rated events in general, or of a specific type; and/or they watch a lot of the same channel or genre. In fact, if two people agree to the conditions, the fact that you live within 100 miles, share the same demographic, and same long term or short-term browsing pattern, could itself simply count as an interactional event, and could make each person pop up on the others connection management system. Once that bar has been cleared, that connection management system could also offer whatever real-time web location and/or browsing together information that the respective parties allow.

In yet another embodiment, the system may analyze engagement information relative to a shared activity. In such cases, the system may automatically suggest conversation topics that are both pertinent to any content being viewed and likely to be of mutual-interest to the users.

As discussed above, the system may allow for disclosure conditions to include certain grace conditions, or latitudes, wherein the user allows certain conditions to be violated, in exchange for other conditions being exceeded. To that end, the disclosure interface may determine whether a violation has occurred and may automatically adjust information disclosure accordingly.

In one embodiment, the information disclosure interface may allow the disclosure information of one user to be held in escrow until the other user's disclosure information is received and/or otherwise authorized for disclosure. Such escrow may require that certain conditions are met before information is disclosed to the users. Exemplary conditions may include: receiving identical information from both users, receiving sets of the same or similar information from both users, receiving information having an identical or similar aggregate point value from both users, and/or receiving information from each user that satisfies an agreed-upon barter value.

In other embodiments, nonreciprocal disclosures may be allowed. Moreover, certain embodiments of the disclosure interface may allow users to create, collaboratively revise and/or execute one or more agreements (e.g., a non-disclosure agreement) before a disclosure process begins. Such agreements may provide an added layer of protection, as the users may agree to keep any disclosed information confidential.

At optional step 107, the system notifies the user that the condition was met and that the disclosure information was shared with the other user. In embodiments where information disclosure is staggered, the system may next repeat the above steps for the other user's disclosure to the user. In certain embodiments, the above steps may occur simultaneously for the other user during the information disclosure process.

At step 108, the system determines whether a predetermined termination condition set by the system or the user has been reached. Such termination condition may include, but is not limited to: the last piece of information from both parties has been disclosed, a predetermined amount of time has passed, at least one of the users failed to disclose information within a certain amount of time, a threshold of information exchanges has been reached, at least one of the users has blocked the other user (permanently or temporarily), at least one of the users has experienced a drop in authenticity ranking/rating below a certain threshold, etc. If the termination condition has been reached, the information disclosure process may conclude automatically 110. Otherwise, the process may be repeated, and the system may continue tracking user interactions with the system and/or other users 104.

In an alternative embodiment, all or at least a part of the information disclosure process may be manual in nature. In an embodiment where the information disclosure process is initiated and progressed manually by the user, the user, instead of the system, may determine when to initiate information disclosure and may ask another user whether that other user is comfortable with sharing certain information. If the other user is not ready to share information at that point in time, they may decline the request to share information. Additionally, or alternatively, the information disclosure process may be manually concluded upon a user activity, such as at least one user opting out of the process. The conclusion of the information disclosure process may also be customizable by the users.

In one embodiment, the system may allow users to operate in groups of two or more users so that users in a particular group may disclose their user information to other users or groups. In such embodiments, some or all user information associated with each user who belongs to a group may also be associated with the group (i.e., "group information"). Moreover, users associated with a group may allow other users in the group to disclose some or all of the group information. As an example, multiple users who belong to a group may each be allowed to disclose any social activities information associated with the group (e.g., real-time, posted and/or saved images, audio, video, or blurred/obstructed/partial-view video, etc.) to other users and/or groups. It will be appreciated that various users who belong to the same group may disclose differing amounts of information to one another.

In one embodiment, the system may prompt the user to write a review of another user to/from whom they have disclosed/received information. The system may prompt the user for a review after the information disclosure process has concluded, during the process, after a certain threshold of information exchanges has taken place, etc. The user may review another user based on, for example: user response time, user response rate, user trustworthiness, user friendliness, user willingness to disclose information, amount of information disclosed by the user, etc.

Both parties may have the option of only agreeing to use the review feature if it is mutual, or even if it is not. Also, such information could be gathered, aggregated and/or stored by the system, such that an overall score may be determined. It will be appreciated that review information may be considered even if two particular parties do not complete the entire disclosure process (e.g., if they do not reveal their identities and/or significant personal information to each other).

Reviews may be public, private, or selectively public. In one embodiment, the system may allow users to see each other's reviews. For example, a first user may view a second user's review upon reviewing the second user. As another example, a first user may "pay" a second user a certain number of points when the second user reviews the first user.

In one embodiment, the system may provide a contact management feature wherein a user's various connections and friendships may be automatically tracked and categorized according to connection. Such feature may allow for some or all real-world and/or digital shared interactions to be both logged and viewed for mutual reference. Insofar as this interaction data in any and all its forms can serve as a variable for an information disclosure process, it would be a form of mutual disclosure.

Figure 2:
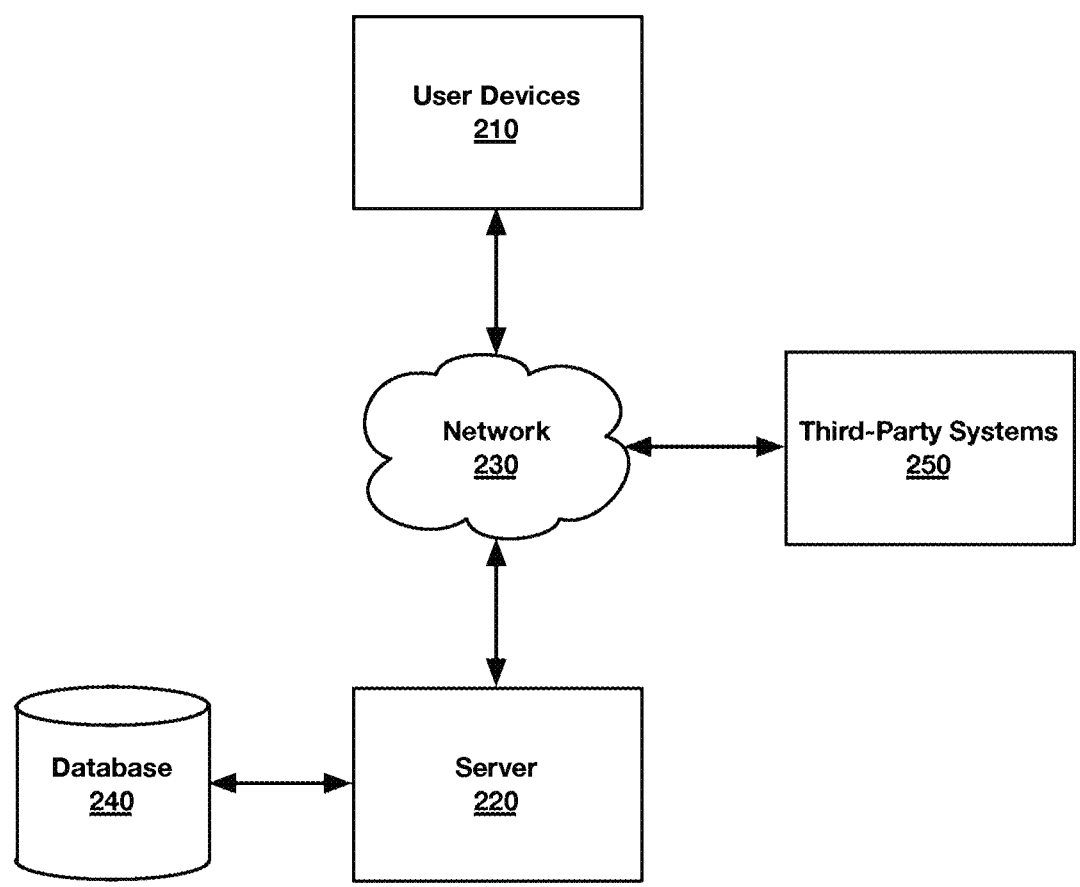
FIG. 2 shows an exemplary information disclosure system 200 according to an embodiment.

Referring to FIG. 2, a block diagram of an exemplary system according to an embodiment is illustrated. As shown, the system comprises any number of users accessing a server 220 via a network 230. In certain embodiments, a user may access the server 220 via a client device 210 connected to the network 230 (e.g., Internet, LAN, cellular, intranet, etc.).

Generally, a client device 210 may be any device capable of running an information disclosure application and/or of accessing the server (e.g., via the information disclosure application or via a web browser). Exemplary client devices may include general purpose desktop computers, laptop computers, smartphones, and/or tablets. Preferred client devices include those with touch screens to allow users to view, select and manipulate various items displayed by the information disclosure application (also referred to as a "client application"). These client devices may optionally have various sensors, such as video cameras, microphones, and other types of sensors that can be used (with appropriate permissions) to obtain images, sounds, and other types of sensor data from their respective users.

Each of the client devices 210 may have a client application running thereon, where the client application may be adapted to communicate with a server application running on a server 220 over, for example, a network 230. Such a configuration may allow users of client applications to input information and/or interact with the server from any location.

In some embodiments, the client devices themselves may also have suitable image and sound recognition software or circuitry, such as artificial intelligence video or sound analysis systems, that can analyze the user video, sounds, and other sensor data and automatically make inferences as to the body movements, facial gestures, and emotional content of the sounds (happy, sad, angry, etc.) produced by the user. The results from these video or sound and other sensor analysis systems can be used to produce user reaction data, including data pertaining to user motion, user physiological status changes, user emotional status and (with suitable sensors) user environmental data.

As discussed in detail below, an information disclosure application may be adapted to present various user interfaces to users. Such user interfaces may be based on information stored on the client device and/or received from the server. Accordingly, each application may comprise HTML data, images, videos, icons, and/or executable code. The executable code may be composed in JavaScript, ECMAScript, coffeescript, python, Ruby or any other programming languages suitable for execution within the information disclosure application or for translation into an executable form.

In certain embodiments, the server 220 and/or the client device 210 may be adapted to receive, determine, record and/or transmit application information. The application information may be received from and/or transmitted to the information disclosure application or server application. Moreover, any of such application information may be stored in and/or retrieved from one or more local or remote databases (e.g., database 240).

Exemplary application information to be stored in and/or retrieved from one or more local or remote databases may include user disclosure information, private user information, and public user information (discussed above). The database 240 may further store user notification information, disclosure data requests, disclosure list categories, etc.

In one embodiment, the server 220 may be connected to one or more third-party systems 250 via the network 230. Third-party systems 250 may also store information in databases (e.g., database 140) that may be accessed by the server. Third-party systems may include, but are not limited to: payment and billing systems, social media and messaging systems, storage and sharing systems (i.e., for video, audio, photos, etc.), address book systems, calendar systems, and/or cloud-based storage and backup systems. The server 220 may be capable of retrieving and/or storing information from third-party systems 250, with or without user interaction. Moreover, the server may be capable of transmitting stored information to third-party systems.

In some embodiments, the server (220) may be configured to receive uploaded video, sound, and other data from the various users, and in turn to interpret this data. In these embodiments, server may further comprise suitable video and sound recognition software or circuitry, such as artificial intelligence video or sound analysis systems, that can analyze the uploaded user video, sounds, and other sensor data and automatically make inferences as to the body movements, facial gestures, and emotional content of the sounds (happy, sad, angry, etc.) produced by the respective user. The results from these video or sound and other sensor analysis systems can be used to produce user reaction data, including data pertaining to user motion, user physiological status changes, user emotional status and (with suitable sensors) user environmental data.

Figure 3:
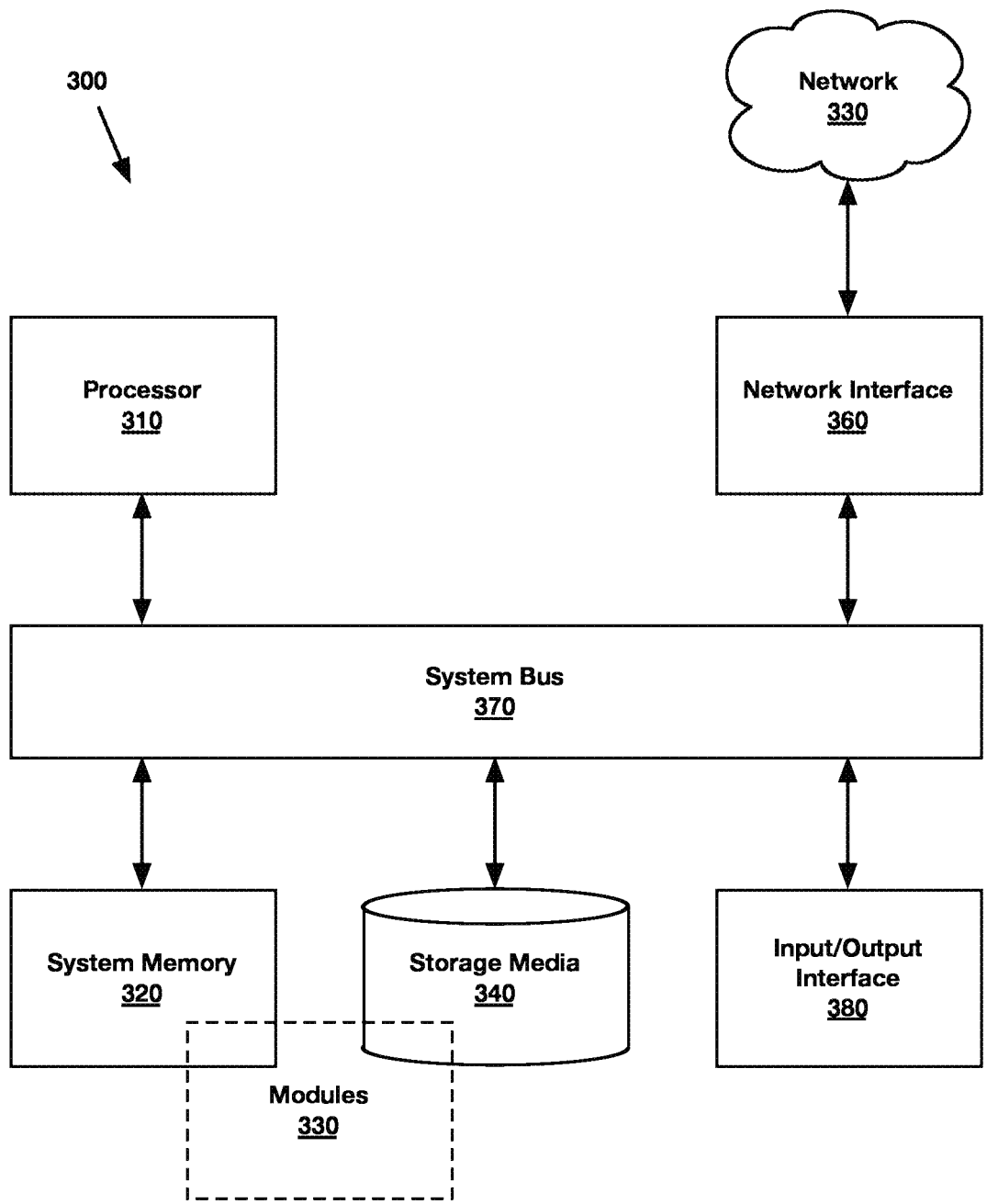
FIG. 3 shows an exemplary computing machine 300 comprising modules 330 according to an embodiment.

Referring to FIG. 3, a block diagram is provided illustrating a computing machine 300 and modules 330 in accordance with one or more embodiments presented herein. The computing machine 300 may correspond to any of the various computers, servers, mobile devices, embedded systems, or computing systems presented herein. The modules 330 may comprise one or more hardware or software elements configured to facilitate the computing machine 300 in performing the various methods and processing functions presented herein.

As shown, the computing machine 300 may include various internal and/or attached components such as processor 310, system bus 370, system memory 320, storage media 340, input/output interface 380, and network interface 360 for communicating with a network 350. The computing machine 300 may be implemented as a conventional computer system, an embedded controller, a laptop, a server, a mobile device, a smartphone, a set-top box, over-the-top content TV ("OTT TV"), Internet Protocol television ("IPTV"), a kiosk, a vehicular information system, one or more processors associated with a television, a customized machine, any other hardware platform and/or combinations thereof. And, in some embodiments, the computing machine 300 may be a distributed system configured to function using multiple computing machines interconnected via a data network or bus system 370.

The processor 310 may be configured to execute code or instructions to perform the operations and functionality described herein, manage request flow and address mappings, and to perform calculations and generate commands. The processor 310 may be configured to monitor and control the operation of the components in the computing machine 300. The processor 310 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination/multiplicity thereof. The processor 310 may be a single processing unit, multiple processing units, a single processing core, multiple processing cores, special purpose processing cores, coprocessors, or any combination thereof. According to certain embodiments, the processor and/or other components of the computing machine may be a virtualized computing machine executing within one or more other computing machines.

The system memory 320 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 320 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 320 may be implemented using a single memory module or multiple memory modules. While the system memory is depicted as being part of the computing machine 300, one skilled in the art will recognize that the system memory may be separate from the computing machine without departing from the scope of the subject technology. It should also be appreciated that the system memory may include, or operate in conjunction with, a non-volatile storage device such as the storage media 340.

The storage media 340 may include a hard disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 340 may store one or more operating systems, application programs and program modules such as module, data, or any other information. The storage media may be part of, or connected to, the computing machine 300. The storage media may also be part of one or more other computing machines that are in communication with the computing machine such as servers, database servers, cloud storage, network attached storage, and so forth.

The modules 330 may comprise one or more hardware or software elements configured to facilitate the computing machine 300 with performing the various methods and processing functions presented herein. The modules 330 may include one or more sequences of instructions stored as software or firmware in association with the system memory 320, the storage media 340, or both. The storage media 340 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the computing machine via the network, any signal-bearing medium, or any other communication or delivery technology. The modules 330 may also comprise hardware circuits or information for configuring hardware circuits such as microcode or configuration information for an FPGA or other PLD.

The input/output ("I/O") interface 380 may be configured to couple to one or more external devices, to receive data from the one or more external devices, and to send data to the one or more external devices. Such external devices along with the various internal devices may also be known as peripheral devices. The I/O interface 380 may include both electrical and physical connections for operably coupling the various peripheral devices to the computing machine 300 or the processor 310. The I/O interface 380 may be configured to communicate data, addresses, and control signals between the peripheral devices, the computing machine, or the processor. The I/O interface 380 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, Fire-Wire, various video buses, and the like. The I/O interface may be configured to implement only one interface or bus technology. Alternatively, the I/O interface may be configured to implement multiple interfaces or bus technologies. The I/O interface may be configured as part of, all of, or to operate in conjunction with, the system bus 370. The I/O interface 380 may include one or more buffers for buffering transmissions between one or more external devices, internal devices, the computing machine 300, or the processor 310.

The I/O interface 380 may couple the computing machine 300 to various input devices including mice, touch-screens, scanners, biometric readers, electronic digitizers, sensors, receivers, touchpads, trackballs, cameras, microphones, keyboards, any other pointing devices, or any combinations thereof. The I/O interface 380 may couple the computing machine 300 to various output devices including video displays, speakers, printers, projectors, tactile feedback devices, automation control, robotic components, actuators, motors, fans, solenoids, valves, pumps, transmitters, signal emitters, lights, and so forth.

The computing machine 300 may operate in a networked environment using logical connections through the network interface 360 to one or more other systems or computing machines 300 across the network 350. The network 350 may include wide area networks ("WAN"), local area networks ("LAN"), intranets, the Internet, wireless access networks, wired networks, mobile networks, telephone networks, optical networks, or combinations thereof. The network 350 may be packet switched, circuit switched, of any topology, and may use any communication protocol. Communication links within the network 350 may involve various digital or an analog communication media such as fiber optic cables, free-space optics, waveguides, electrical conductors, wireless links, antennas, radio-frequency communications, and so forth.

The processor 310 may be connected to the other elements of the computing machine 300 or the various peripherals discussed herein through the system bus 370. It should be appreciated that the system bus 370 may be within the processor, outside the processor, or both. According to some embodiments, any of the processor 310, the other elements of the computing machine 300, or the various peripherals discussed herein may be integrated into a single device such as a system on chip ("SOC"), system on package ("SOP"), or ASIC device.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein, and the corresponding drawings, are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

FIG. 4 shows an example of how the invention can annotate certain specific video media with user reactions/comments.

As shown in FIG. 4, in some embodiments, the invention may be a computer-implemented method of sharing user reactions/comments relating to specific video media. Here, this method may comprise receiving, by a server (220) (and usually over a network such as the internet 230), user information associated with a plurality of users (402, 404, 406) (more specifically, from these user's user devices 210). For each (or at least some) of these users, the user information will typically comprise an activity-based disclosure condition comprising a defined video media identifier for a defined video media (430), user demographics, and user reactions/comments (C1, C2 ... Cn) on this defined media defined by said defined video identifier. Put alternatively, user "Fred" (402) may be watching or thinking of watching the defined video media "Star Wars Episode 1" (430). Fred's disclosed demographics may be that Fred is male, age 22, a college graduate, science fiction fan, and lives in San Diego, Calif.

In this case, assume that Fred (user 402) has watched this video media and has recorded his reactions/comments at various times during the film. His user reactions/comments, C1, C2 ... Cx may comprise any of text, audio, or video reactions/comments that correspond to different time stamps (e.g., playback times) in the defined video media associated with the defined video identifier (430, here Star Wars episode 1), thus allowing his particular user reactions/comments to be synchronized with this defined video media (430). Fred can use his user device (210) to upload his demographics, media reactions/comments C1 ... Cx for this defined video media (430) over the internet (230) to the server (220) where the invention will store these defined video media identifiers (430), user demographics (Da), and user reactions/comments (C1 ... Cx) in a database (240).

Suppose that Fred (Use-1, 402) then wants to find other fellow science fiction fans with his age and education near his San Diego location, intending to mix their reactions/comments on the Star Wars Episode 1 defined video media (430) with his reactions/comments, thus creating a "do it yourself" Mystery Science 3000 version of Star Wars Episode 1. Here Fred (now 402a) can enter in his search parameters such as "Male", "age 20-25", region San Diego, and defined video media identifier into his user device (210) and transmit these search parameters to the system server (220). Fred might even specify that he is looking for "sarcastic" reactions/comments.

In some embodiments, the system search function may also be configured to search for other users watching similar video media (e.g., same genre). The search function may also be configured to suggest previously liked users, new users, or various mixtures of the two.

According to the invention, the system (or method) receives such search parameters from at least one user (here Fred 402a) according to any of the defined video media identifiers (Star Wars Episode 1, 420), user demographics, and user reactions/comments (e.g., type of reactions/comments). The server (220) uses (e.g., searches) the database (240). It can use the search results to output any of those video media identifiers, user demographics, or user reactions/comments that match the search parameters. So, the invention can thereby produce suggested matches and transmit these suggested matches back to at least one user.

Fred (402, 402a) and any other matched users (here 406) can then approve at least some of these suggested matches (432). Thus, the invention will typically receive at least one approved match (from these suggested matches) from at least one user.

For each defined video identifier (430, here again Star Wars Episode 1 in our example) selected by both said at least one user (402) and by at least one approved matching user (406), the invention (more specifically server 220) will produce a combined set of user reactions/comments (438) that incorporates at least some of user reactions/comments selected from the various at approved matching users (here reactions/comments from user 1 432, and reactions/comments from user "n" 436). According to the timestamps of the various user reactions/comments, these individual reactions/comments are sorted within an adjustable time parameter. The adjustable time parameter, as previously discussed, can be set up so that if two users might speak at the same time during the video, the system may automatically adjust the timing slightly forward or backward to allow both reactions/comments to be understood. The invention (often server 220) can then output this combined set of user reactions/comments. For example, the system may be configured with a 30-second adjustable time parameter, and can be given an automatic ability to shift one user's reactions/comments up to 30 seconds away from the original timestamps.

Note that the invention may or may not further combine these reactions/comments with the video media associated with the defined video media identifier. Often, it may be preferable for copyright purposes to output the combined reactions/comments as a separate file or stream. In these embodiments, the combined reactions/comments can then be synchronized with the video media by an individual (perhaps Fred, 402) who owns playback rights to that particular defined video media.

Thus, in some embodiments, the combination of the video media (430) and the combined user reactions/comments (438) may be done by further obtaining, using either the server (220) or another computerized device (such as 210), the defined video media (e.g., the actual Star Wars Episode 1 video) specified by the defined video identifier (430), and using at least one computer processor and at least one video display screen to playback (in a time-synchronized manner) this defined video media and the combined set of user reactions/comments (438).

As previously discussed, although the reactions/comments may be text, audio, or actual video of the various users making the reactions/comments, in some embodiments, the system may be configured so that at least some of the user reactions/comments may be displayed in a form of partial or total avatar of at least some of the users. So, if Fred, our Star Wars fan, wishes to appear (or even sound like) Yoda while making his reactions/comments, the invention can accommodate him.

Moreover, in some embodiments, the server (220) can also be configured to translate the user reactions/comments from either the original language to a second language or transcribe audio user reactions/comments to written user reactions/comments or sign language user reactions/comments.

Regardless of avatar use or not, according to the invention, the defined video media identified by the defined video media identifier (430), and the combined set of user reactions/comments (438) can be used to produce any of a user commented video media or a user commented subset of the video media. That is, the user may only wish to view portions of the video media, the invention can be used to produce user reactions/comments on the edited video media.

As previously discussed, however, the reactions/comments (432, 434, 436, 438), although containing time stamps that allow the reactions/comments to be time-synchronized with their corresponding video media, may also be stored or transmitted as separate file. Here, in some embodiments, the user reactions/comments may be sent from the server (220) to at least one other computerized device (210) with non-transient memory and stored in said non-transient memory according to any of an SRT or general-SRT file structure.

Some users will likely be more interesting than other users, and their reactions/comments may be in higher demand. Thus, in some embodiments, to allow more or less popular users to be more easily discovered, the server (220) may be configured to enable other users to vote on or evaluate the various user reactions/comments. This voting can range from a simple like or dislike, to more complex evaluation schemes, where users can also give their opinion of the user's general type of reactions/comments (e.g., fun, silly, serious, informed, trolling etc.) Here, at least during searches, the server can output either the results of such votes or a statistical summary of the results of these votes. So, users with reactions/comments that tend to be more insightful or funnier than other users can, for example, be more easily found.

Here, for example, assume that the plurality of users comprises at least a first user (402) and a second user (404). The review or rating system can be done by receiving, by the server (220), from the second user (404), a review of the first user (402); and associating, by the server (220) this review with the first user (402). The server can then transmit these reviews and/or statistical summaries of these reviews to other computerized devices (such as 210).

Similarly, in some embodiments, the invention (e.g., server 220) can be configured to accept user data and search data that include items such as other user networks, other user demographics, other user video media preferences, and history of other user reactions/comments. For example, these user demographics can include items such as the user's username, a name, age, school(s) attended, degree(s) obtained, skills, hobbies, habits, birthplace, current or previous residences or locations, employer, family members, strengths, weaknesses, goals, content preferences, favorite foods, favorite music, voluntarily disclosed medical information, and the like.

The invention can also be used with real-time reactions/comments, as well as previously recorded reactions/comments. Thus, in some embodiments, such as during playback of the defined video media, either the server (220) or another computerized device (210) can be used to merge the combined set of user reactions/comments (438) with real-time user reactions/comments. Here the server (220), or other computerized device (210) can be used to transmit a combination of said defined video media, the combined set of user reactions/comments (438), and the real-time user reactions/comments.

Watch parties: In some embodiments, the server may be configured to save a record of a set or subset of users providing user reactions/comments for a specific media as a "watch party." The server may also be configured to make such records searchable by other users. Thus, in some embodiments, the invention may enable various users to search the server for past or scheduled future user reactions/comments by various watch parties.

Further Discussion

In some embodiments, the srt file, and similar specific overlay format files, can be configured to be highly manipulable.

If the user has not seen the movie before, the choice could be given for the reactions/comments to be formed into a highlight reel to be shown at the end. Depending on the user setting, for example, if the reactions/comments are both more than 20% of the playback time of the given scene, and are in the form of less than three total reactions/comments, the playback can pause at the scene's end, and the reactions/comments on that scene can be played back (with or without the repeat playback and accompaniment) of the scene. Alternatively, the reactions/comments can be converted to be relatively inaudible, but their transcription can be shown.

If the user has seen the movie, the system can also be configured so that the opposite can be done. For example, the reactions/comments could be output as a voiceover and the movie's audio lowered when the reactions/comments come on. Here, the watch party reactions/comments (the srt file) and the associated software modules can be configured to include any of ordinary sporadic interruptions, a muted voice-under (rather than voice-over), or moved till after the scene or movie, and/or output as text (e.g., subtitles), In some embodiments, the system can be configured to collate the results from multiple watch parties so the user can review the results from several watch parties in a single viewing. For example, the system may be configured to detect watch parties by how many or few generally temporally overlapping reactions/comments they have. Then, as needed, it could move the reactions/comments slightly forward or backward in time (based on the specific user's setting) so that reactions/comments do not conflict, or alternatively play the reactions/comments in whatever sequence the user chooses. The system may also be configured with an option allowing users to apply various rules, such as: always move reactions/comments till the first long enough dialogue-free space after the reactions/comments where those reactions/comments would fit and, as necessary, truncate or speed up the reactions/comments if they do not fit.

Such options might be particularly useful for first-time watchers of a given movie, who do not want the interruption. In contrast, movie re-watchers might specifically want the reactions/comments to interrupt the movie. Alternatively (useful in the case of a watch party that includes the movie actors), play the watch party as a voiceover, and play the movie only at the background volume.

In some preferred embodiments, the system will often be configured so that the watchers can pause the playback and complete the movie or show at another time. However, the srt will preferably be configured to be seamless for any such pauses and starts. Since starting and pausing are often irrelevant to the system, the system will often be configured to allow the users to control (e.g., choose to disclose or not disclose) when they actually watched the various movie or show segments. This would allow the original watchers to return to scenes, add or subtract reactions/comments, or otherwise edit their reactions/comments before sharing the srt.

In some embodiments, the system can be configured for hybrid watch parties that include both a pre-recorded watch party and a live watch party (either a live video watch-party or a live real-life watch party). The system can even be configured to enable "nested" or "recursive" watch parties. Here a watcher or watch party of a watch party (or a meta watch party), would itself be recordable and then form its own srt. In theory, such nested or recursive parties, especially if they are short shows or highlight reels, could be arranged as ongoing agglomerations with endless layers and become memes of a sort. Here each additional watch party, or individual user, can add their own reactions/comments on the movie/show or on previous reactions/comments. In some embodiments, the system can also enable voting. This would enable these memes (nested or recursive watch parties) to be curated through voting, so that only the top voted reactions/comments "survive."

In some embodiments, watch parties or reactions/comments may be selected based on other types of criteria as well. For example, such criteria can include: how liked the srt are, how the watch party members rated the movie themselves, the watch party members demographics, and so on.

Using demographics as an example, the system can be configured to enable a user to choose the watch party demographic based on the movie content and select to see the reaction to the movie by a demographic that is in one or more ways depicted (or not depicted) by the movie. Such selections could themselves be automated: for example, select always to show Germans watching German movies, or teenagers watching teenagers, or professional or semi-professional actors watching any movie (or live theater), local fans watching their team for replaying sporting events, Italians watching opera, and so on.

In some embodiments, the system can also provide user selections to include viewing feedback interest/liking/disliking the upcoming movie from other watchers who state that they are fans of the movie's director, lead actor, subject matter, as well as other watchers that may have a or relatively similar/different past or future movie watch list). Alternatively, or additionally, these other watchers may be watchers with similar movie tastes. These other watchers can be selected from those watchers that may have posted questions for discussion about the movie, and who may have informed the system about their general willingness to anonymously chat with various strangers in any of writing, audio, video about the movie. Here, the system can request that such watchers give appropriate permission, such as permissions to exchange information, length of time per session, permission to have their input recorded and added to various movie-specific srt, willingness to be notified and contacted in real time of the watching (to enable the watcher to, jump in during or immediately after the watch session, and introduce themselves).

In some embodiments, the system may be configured so that the specific content of the reactions/comments of the watch party (or its individual members) could be scanned, and mined in myriad ways (such as opposite or comparable frequency of reactions/comments, intonations, political or other opinions). This would enable the contents could be used as another type of search index. In this embodiment, a user who wishes to see watch parties that took an interest in a given character, actor, or cinematic or another topic. Other possible search indexes might be watch parties that correctly or incorrectly predicted the ending of a detective or other show, was good at noticing plot flaws, or that related the movie/show to current events, or that sincerely attempted to apply the show to their own lives in the moment and real time situation.

Other search parameters are also possible. The system may also be configured to enable to see watch parties of certain compositions. For instance, a movie about an ethnic or any other conflict being watched by strangers but from the same or from the opposing groups. As another example, users might wish to see a watch party wherein at the end the watchers gave similar or opposite ratings to the movie, or gave a broad range of ratings. The contents could also be used to recommend fellow watch party watchers from other locations. In addition, video content could also be mined. For instance, in some embodiments, the system could be configured to implement eye tracking software, or track other biometric parameters. This data, when combined with the watcher's profiles, could also be used as a search index as well.

In some embodiments, the system can also be configured to automatic translation of watch party reactions/comments from other languages (either verbally, or by text). This would enable the watch parties to be automatically translated, resulting in the watch parties with their own set of subtitles and/or supertitles. The audio or video (either of the watch party, or of the video media) could also be completely or selectively removed by the system, as desired.

In some embodiments, the system can also be configured so that when multiple watch parties are collated, or in the case of large watch parties, the faces of different watch parties could be manipulated, to form whatever gallery the user prefers. In other words, even though the srt is pre-recorded, once it is downloaded, the system can further modify the srt files. For example, each party member in the download srt can be stripped out and assigned to its own srt (e.g., party member specific srt files). These party member-specific srt files can be further manipulated on a member-specific basis. If video or avatar information is included for each party member, the arrangement of the various party members can be reassigned by the system into alternate arrangements as desired. For example, the party members could be arranged in different rows, columns, wrapped around the display screen in different theater seating configurations, and the like. With virtual reality, the gallery could be created in the original srt recording, or generated through AI and a simulation to be a theater in the round or in any other configuration, lighting, and so on.

In some embodiments, the system can be configured so that, upon user choice, the members of the watch party could be pinged and told in real time they are being watched and given the opportunity to join, or to see but not be seen in real-time, and so on. If they do join, this could create an expanded srt, and second-order watch parties. There could then be a second watch party with the original watch party goers making reactions/comments about their original reactions/comments, commenting on their original reactions/comments or modifying their original views. The invitees could also be provided with a timeline of their reactions/comments, that pings them a minute before these reactions/comments, or their highest-rated reactions/comments, so that they can just pop in and out, and not have to watch the whole thing.

The system may be configured to splice previously recorded srt files with live action srt files associated with an ongoing live action watch party in some embodiments. If someone else (a friend or stranger) is watching the same movie, as the user determines, at the same time, for instance, within the same 10-minute start time, then whichever users ask/allow to be told that, are told that. The first watcher would wait 10 minutes, while the second watcher(s) catches up (and records), and then the two parties merge, but at the end, it becomes one fused srt, so that faces in the first ten minutes, are like they are for the rest of the watch party when they are watching together. This could be at any other point (i.e., time location) in the movie. So, if someone has to leave early, or leaves in the middle and comes back, a later recorded section can get spliced in with the rest.

In some embodiments, partial avatars or photoshopping might be used as a default setting. For instance, users might choose to automatically and always have the system crop out, or photoshop, everything except for their faces. By whatever criteria the user sets, even their faces might be photoshopped, or unflattering expressions or angles, portions of the user's body, etc. touched up or eliminated. The system may also be configured to automatically edit out certain types of words and sounds as well. Thus, the system may have certain automatic audio filters such as profanity, background noises, body noises, or filler words such as "uh . . ." could be automatically eliminated.

Addtional Examples and Options:

Queue comparison. In some embodiments, the search parameters can also include searches of another given user's queue for programs to watch in the future. Here, rather than the system simply comparing two different users past watch histories (and integrating those users' positive and negative ratings of what they watched, plus whatever viewing preferences the users may have manually added), users could allow the system to compare their future watch-queues in addition to or instead of their previous watch history.

Variable speed: In some embodiments, the system can be configured to automatically vary both the speed of the video media and the speed of the user reactions that are synchronized to this video media according to at least one user selected parameter. Thus, for example, rather than simply waiting 5-10 minutes for all the different watch party members in order for them to be ready to start, the system can instead be set up to speed up or slow down the video within various parameters for each user. For example, user A starts to watch at 10 PM with user B. Then user C wants to join at 10:10 PM. Upon everyone's approval, the system can automatically speed up user C's watching speed and/or slow down user A and B's speed to allow user C to catch up. When user C catches up, the system can then automatically return to normal speed, or to whatever speed everyone agrees upon.

In some embodiments, the system might also be configured to store a given user's speed preferences for each genre or sub-genre (e.g., news-segment type), and apply these preferences.

Smart Community Building—Searching by Differences in User Demographics:

In some embodiments, it may be useful to configure the system to be able to search for other users with other user demographics that differ to a specified extent from a given user's demographics. This can include a specified number of degrees of separation, or other criteria.

Similarly, the system could support searching by the demographic of people who are from the given location, expert on the given subject (for instance, based on abstracting out the frequency of words or phrases in the video in "word cloud" fashion), or in some other way personally connected to the content on the screen. This would require that the user share personal information such as their social media profile page with the system. The system could give a choice as to whether the demographic or other reason for one user's watch-party invitation to another user is given ahead of time only to the invitee or is given to the whole watch party, some sub-section of the watch-party, or to only to certain select watch-party members.

Moreover, due to "spoiler" consideration, one preferred watch party demographic might be users who have already seen the video one or more times, and who are watching it as a "rerun." Users who have seen the more than x number of times (e.g., diehard fans), and are relative experts in the content (such that they may even be using the content as a mere conversation starter) might be a further demographic. These users stand in contrast to first-time viewers, and, who, thus, wish to hear every word of the content being spoken with little or no interruption, in order to "independently" form their first impressions of that content.

User availability: In some embodiments, the system may also be configured to enable users to add their times (days and times) of watching availability to their demographic parameters. This enables other users to see a given user's availability on a calendar-like interface presented by the system, and know when such users are available or not available for a given watch party. The second user could, then, for instance, schedule, or "book," a watch party with the first user on the calendar-like interface (or, if need be, request the scheduling), identifying themselves only by their username and/or demographic.

Volume control: In some embodiments, where the user reactions comprise verbal comments or other sounds, the system can be configured so that outputting at least some user reactions from the combined set of user reactions can further comprise varying a volume of these verbal comments or sounds according to at least one user selected parameter. These volume adjustments can include silencing and tapering up and down, and can be a function of natural breaks in the action (e.g., end of scenes), timed "commercial breaks," intermissions, and the like.

Including non-comment type user reaction data in the SRT files: As previously discussed, in the present disclosure, the concept of user comments has been generalized to also include various non-verbal and non-text comments, such as user motion, changes in user environment, user physiology, and the like. According to the invention, these non-verbal and non-text type user reactions can also be stored and retrieved from the SRT files as well.

Here, the non-verbal and non-text type user reactions can be derived from suitable sensors, which can include standard audio and video sensors, and which also can include suitable motion detectors and even chemical detectors as well. For example, changes in user emotional status and some types of user motion can be obtained using video data and suitable automated vision software. Additionally, users may also wear motion sensing gloves or other types of clothing. Suitable environmental sensors, including airborne chemical sensors, may also be employed.

Note that although the system will generally encode the resulting sensor data into the SRT (e.g., generalized-SRT) files, there is no requirement that the system will play back the data in the same format. Rather, depending on the capability of a given user's equipment, the system may play back certain types of sensor data in an alternate format. Thus, a perception of tobacco smoke may be rendered as a written comment: "room smells of tobacco smoke", as opposed to attempting to duplicate the tobacco smoke in another user's room.

For example, according to the invention, physiological data can be abstracted out and stored as SRT data. So, one watcher could wear a virtual reality enabling (and metaverse) glove and hold a fake hand while watching, as if they were holding their spouse's, or grandchild's hand while watching, and then the other user could watch later and have the hand holding experience, squeezing at scary parts, more subconscious micro-behaviors, and so on.

Various odors can also be detected and stored in the SRT files as well.

Seasonality and timeliness could be another complementary factor, and search criteria. Watch parties among strangers re-watching videos, might particularly benefit from seasonality. So, the anniversary of an episode's original air date, or holiday episodes, could serve as a common bond between strangers, and, thus, as a basis for notification of an upcoming possible watch party content for a watch party among those strangers.

People watching watch parties: People enjoy watching other people and commenting on them. According to the invention, this can be done by simply using video media of various situations, such as persons strolling by on a street. Here "people watching" can simply be listed as another user demographic showing viewing interests, and/or as another search parameter. Of course, "people watching" itself could be specified (e.g., watch people walking on Rue de Rivoli together with at least two English speakers and two French speakers, and/or momentarily zoom in on all people six feet in height or over, who are talking on their mobile phone while walking, so as to specifically "study" that group and its behavior).

Alternative graphical representations of user reactions/comments: In some embodiments, when at least some of the user reactions comprise text comments, the system can be configured to output at least some user reactions by changing the graphical representation of said text comments according to at least one user selected parameter.

These alternative graphical representations can include color coded or branching dialogues of watch party text dialogues. This can be useful when the different comments go by too fast to easily follow. Here, the comments can be mapped or charted as a scrolling network graph with different nodes, branches, and connection lines. For example, some of the branches may have more connecting lines than other lines (signifying the greater quantity of dialogue and/or number of exchanges). The system can be configured to allow users to jump or switch focus from one branch to another, or be in all the branches, with color coding, alternate fonts, and other graphical features utilized to make particular branches or users easier to follow.

Similarly, representations (especially post-facto) could take the form of interactive word or phrase clouds, by which the frequency of a given watch party member's comments and/or a given word or phrase (or, using artificial intelligence, relatively synonymous or otherwise similar words or phrases) is represented by the size of the watch party member's name, or by the size of the word or phrase, in a "cloud" representation. In addition, clouds could be based on any information in the SRT (e.g., physiological reactions or intonation, or combinations of words and a given physiological reaction or intonation). Moreover, these various clouds could be interactive permitting users to click and "drill down" on the particular name, word, or phrase and see all of the given instances, in text, audio, or video form, abstracted from the source sortable as they choose, and/or see them in situ in the given written, audio, or video context as clips or of whatever length that they specify.

Use of cameos: In some embodiments, some users may enjoy spicing up a given watch party by inviting the original presenter or content-producer, or a celebrity, or expert to make a cameo appearance. Thus, this would be a literal, or figurative, celebrity who appeared in the given video, or has some other relatively close connection to the video's subject matter. Here this can be done by enabling such celebrities or experts to indicate their availability for hire in their user demographics, thus enabling other users to seek them out and engage them as mutually desired. Watch parties of this sort might particularly lead to meta watch-parties.

In addition, any native speakers of the language of the given video, who are willing to field language and cultural questions about the video, would also be experts. In particular, language immersion could be permitted by means of using the various natural language processing translation systems. The watch party conversation itself could be translated and subtitled in real time, and constitute part of the SRT, for later viewing and study by the watch party members or others, or for educational meta watch parties by the watch party members or others. Accordingly, the SRT of these watch parties could form its own genre, and be a particularly valuable language learning tool for others. Indeed, in all of these cases, the system could also include a payment system whereby the watch party members contribute payments to pay the expert for the "cameo" appearance and/or they thereafter own the content and can charge other users to watch that watch party and/or to make meta watch-parties on the basis of their original watch party.

Similarly, as a further form of edutainment, educational content generally would lend itself to cameos by the given educator (or by a different educator with a similar specialization). Indeed, educational content, or other richer content, might lend itself more to watch parties among strangers than more emotional or fictional content. Thus, in watching an online course, an individual could use a solo watch party to pause the video and insert their questions "in situ." Then the presenter, or other expert, can create a meta watch party wherein they answer those questions, allowing the first user to then watch that party (or simply those answers) and receive the answers to their questions. In addition, users who are somewhat expert in their own right, might find other users who are as well, or essentially "study buddy" watch party members.

Spontaneous viewing sessions: Occasionally, users may wish to instantly create watch parties with those other users that are available. This can be done in response to breaking news, or other types of events. Here, to facilitate such spontaneous watch parties, the system may be configured to enable users to search for other users that are presently online as one of their search parameters. Other search parameters can also include the other user's online schedule, so that a given user may include searches such as: presently online, and projects to be online for the next 30 minutes as another type of search parameter. In addition, they may include presently online (or offline) and seeking to watch the video (e.g., a Tik-tok video) in the next x number of seconds or minutes with whomever else (per the user's preferred demographic criteria) is also seeking to watch the video in that given time span (or whomever else up to a preferred watch party size), and share reactions to the video.

Moreover, because this would typically be a first-time viewing of the content, a further demographic might be agreeability to stay on the watch party for a specified number of second, or for x % of the video's length, and share impressions of the video. Because people do not necessarily like being recorded, especially in speaking impromptu or with strangers, this might also simply be agreeability to a protocol of dialogue, and to share 1-5 written impressions ("comments" within a 24-72-hour span after the initial viewing). These written or spoken comments and dialogue then would be appended to the video (or automatically inserted at the relevant time-stamped junctures within the video) to thereby form the given watch party SRT for later viewing by others. Similarly, other demographics might include willingness for the watch party to be recorded and form an SRT, and/or willingness to optionally entertain the use of this interaction as a basis for future contact, or for beginning personal information disclosure rollout process (e.g., as a basis for higher prioritization for invitations and for promoting repeated spontaneous or ordinary watch parties between those same users).

In addition, users might allow watch party composition to be unilaterally viewable prior or during the watch party such that other users could see the demographic composition (or be notified of it) without having to reveal their own identity. These latter users could then choose to join the watch party based on the party's composition.

Voice activation: In some embodiments, the system can be configured so that when people are speaking up the video could automatically pause, in order that the comments can be heard, but the video itself not missed. Then the video could restart when they stop speaking for 2 seconds, or whatever time they set, or when they actively restart it. Other such optional voice activated features can include automatically going to a lower volume or to subtitling. Automatic replay can also be done, as well as automatically reformatting the video output to change the video size of the user image, or user avatars, or user video, depending on who is talking. In this way the images of the watch party members who are speaking might momentarily expand to take center stage, while the video itself would be shrunken down to accommodate the expansion. Similarly, the watch party members could even entirely disappear when they are not speaking, and only reappear when they are.

Using metadata from previous watch parties and other users: In some embodiments, the system may be configured, often by using artificial intelligent natural language processing, to provide one or more parameters from the history of other user reactions/comments from previous watch parties. For example, if a given user has a history of taking offense at certain comments, the system can determine this, and might offer a notification, or raise a visual "flag," to inform other users about this issue. Similarly, if a given user has a history of being enthusiastic about certain topics, the system can also determine this, which can be valuable for other users to help keep a conversation going.

Similarly with respect to certain video media, the system can also keep track of those portions of the video media associated with certain types of user comments, and also raise a notification or "flag" in advance of such video sections.

In addition, as in certain sports a type of "box plus/minus" statistic, or "participation" grade, could be derived in order to determine in what social or other contexts, and to what extent, a given individual tends to enhance watch parties. Using artificial intelligence, the statistic could also reflect the given user's uncanny ability to spur or facilitate third-party conversations within the watch party. In addition, the statistic could be given to pairs or groups that usually join other watch parties as a pair or a group. Thus, users, or groups of users, could build reputations as enjoyable watch party guests, and accordingly build followings. Other users could use this demographic as a basis for inviting them to their watch parties.

Searching for responses from specific users: Users might watch something and be curious as to what opinion others would have about some particular section of it. For instance, a grandchild might be interested in a grandparent's real-time impressions of a particular segment of a show or movie, if not necessarily for the entire show or movie. To do this, in some embodiments, the system can be configured so that the output of at least some specified user reactions from the combined set of user reactions can be selected by another user according to any of the specified user identity and type specified user reaction. Thus, for example if a given user is interested in whether a specific friend reacted favorably to a section of video, the given user can search for the specific friend and "favorable" reactions (e.g., the system can know that certain words are favorable, and other words are unfavorable) and (given the proper permissions) find all of that friend's favorable reactions to multiple videos, or favorable reactions to a specific video, depending upon the search parameters.

In some embodiments, a user may also designate a section of a video as being of particular interest and solicit reactions by other users. Thus, by designating a section of video of being of interest, and then searching for responses by specific other users, a given user may, for example, determine how their friends react to a given section of a movie, news program, or other video media.

Consumer research and online marketing applications: In some embodiments, even if a given user does not want to comment on what they watch, they still might be interested in talking about it, should someone else have interest, and contact them.

In this embodiment, instead of watch partying, the system may be configured to create a queue of most the recent watchers (per their settings as to how long they were still in the flow of the video or other content and would be able to, or want to talk about it), or those who were in the middle of watching. Based on how much after watching the user wanted to see others' reactions/comments about, or be contacted simply based on their profile to talk or entertain questions about, the given content. For some favorite videos (or audios), a user might feel they always would be willing, whereas for others there might be a default setting for a week. Or, the user might allow the system simply to show when they watched it, and let the other user be the judge. Users could also set it up so that the record of their viewership just disappears after a certain amount of time.

To the degree that all the user watch party and other reactions/comments float free of the video or other content itself, and can be housed, or at least linked together on an independent site, the user might be considered to have a semi-anonymous semi-universal (cross-site and cross-platform) online login/identity. Accordingly, user B could then click on the user in the queue to see what else that user A has watched, recently or otherwise, to judge if they want to be in contact about the current reactions/comments, or otherwise. User A could also have multiple online identities, with whatever criteria they wish. So, for instance, all their movie reactions/comments may be viewable together, but not their political reactions/comments, or so that all their reactions/comments are viewable to foreign residents who they'll never meet, but not to local ones, and so on. Similarly, user A can choose to allow the tracking of (or proactively contact and share) their online location at a given time, only for user B (for instance, because their current location is, or resembles, the location where user A and user B first met), but not with user C. Or user A can choose to share their online location with user B, but only up to, for instance, 3 times per day.

Searching for other users with defined demographic degrees of separation from the searching user: In some embodiments, the search parameters can include differences between the user's demographics and the demographics of other users. Thus, a user might search for other users with backgrounds that differ from theirs, or are heterogenous or are homogeneous, in a specific manner. Indeed, different types of heterogeny and homogeneity could be awarded points. Thus, the said heterogeny and homogeneity can also comprise video game parameters. For instance, users could try to have watch parties with other users who are most different from them, or most different from them on certain parameters, such as a teenager having watch parties with as many seniors as they can.

Moreover, users could employ the system for an instant and on-demand focus group of any desired sort, such as for a virtual reality fitting/dressing room, talent-show, or any skill-review (e.g., a home repair or an instrument playing) use. For instance, in real-time and/or after the fact crowds could be recruited to vote, or comment, on outfits that a person tried on, and say what they like or don't. The watch party members could talk among themselves to arrive at a consensus opinion, or they could each individually identify their demographic. In this way a user could have a focus group, as to who the outfit appeals to, who it doesn't and why for each. The user could tailor the focus group to a specific age, gender, or other demographic. Similarly, for anonymity they could pick a focus group of people from far away. For reducing personal offense, other screening, or "policing" could be used, such as, commenting is limited to relatively anodyne, or multiple choice, responses. Or, alternatively, comments could be much richer, offering the subject pointers, or other instruction, on how to improve the given appearance or "look" or the given performance. To the degree the comments take the form of meta watch-parties, the later watch parties could critique the earlier watch party critiques, and debate what the earlier parties got wrong, and got right, and so on with additional later watch parties, ad infinitum.

Similarly, using artificial intelligence, the system could facilitate watch-party conversations by means of automatically populating the videos with facts that (based on the watch party members' demographics, or specific social media or other profile) would be likely to interest them. Thus, in addition to manual watch-party video and text commenting and annotation, if the system recognizes an interesting or unusual place, object, person, phrase, word, and so on, through image recognition or through the transcript, that is likely to be of interest to the watch party members, it can smartly provide related interesting facts. The smart screen item labeling and commenting, and the resulting watch party conversations, would then all be included in the SRT for future viewing.

Karaoke-like functions: Note that in some embodiments, the video file being viewed may be constructed. For instance, if the video, is a music video it may be a karaoke-like video that lacks the vocal tract for that song. Here a user can "sing along" and store their responses on the SRT file, thus creating a karaoke-like experience. Similarly, an actor may rehearse a scene from a movie or play by using an edited version of the movie or play that lacks that actor's particular lines. In other embodiments, the server (220) may be configured to remove certain voices or other audio components from the original source video for this purpose.

Using voting or artificial intelligence, these responses can also comprise video game parameters. Thus, a game could challenge users (or user groups) to give an impression of a given line of a famous sequence (or of an entire show or movie). Votes could be based on voice resemblance, or on proper intonation resemblance, personal interpretation, or other criteria.

Limiting access to user reactions: In some embodiments, the system can be configured so that a given user can designate at least some of their user reactions as being any of confidential to some or all other users, time limited, or playback number limited.

This can include information rollout disappearing-disclosures, and "ceilings" and "floors" on the degree of disclosure. For instance, a user might cap the number of their comments/reactions that are viewable to any other, or a specified other, user to 20 comments/reactions, till some further criterion is met. Here a user can designate their responses as any of "view once" or "disappearing." Here that user's reactions/comments, photos, videos, annotations, etc., are only viewable the first time that they're opened. Because people might hesitate to disclose to strangers even with setting conditions for the rollout, and the rollout being gradual, a disappearing feature, or the option for one, would encourage use. Other permission options include allowing the reactions to only last for a set amount of time.

Here, for example the user reaction data may still be stored on the SRT file, but in an encoded manner requiring the system to decode the encoded reaction data each time. Thus, once the permission was exceeded, the encoded SRT response data for that user can no longer be decoded. SRT files may still be generated, edited, and copied, but the restricted user reaction data can no longer be interpreted.

Searching by user identity, reaction type, and video section: In some embodiments, the user reactions can be selected by a given user according to any of the other user's identity, type of user reaction, and video section (e.g., time location in the video where the other user reaction occurred). The user can further set the system to deliver the search results at user selected points along the video, such as at the end of the video, or selected intermissions (such as commercial breaks). This feature can be useful for watchers who prefer to only hear reactions/comments at the end, or in intermissions, and enables the comment composition of the other users (who have watched the video) to be viewable and searchable. Depending on playback preference, a given viewer may direct the system to populate a border gallery with faces while watching, but also direct the system to only update the avatars according to the user's search preferences.

User reactions indicative of emotional state: Some user reactions, such as various user body motions, sounds, user physiological parameters, and even user environment olfactory data can be indicative of that user's emotional state. In some embodiments, the system can be configured to automatically detect such user reactions, and to report these user reactions as indicia of that user's emotional state, or accordingly modify their avatar based on some pre-set conversion system.

Some of this automatic detection and reporting can be done using suitably configured artificial intelligent video or audio recognition systems. These systems can be configured to recognize common emotional sights and sounds such as smiling, laughter, sadness, crying, frowning, disgust, and other facial expressions (or micro-expressions) and sounds associated with these emotions. The system can report its assessment by various methods, including altering the appearance of that user's avatar appropriately, or by other methods, such as text commentary (e.g., "user X looks disgusted.").

Detecting and reporting other types of user reactions: Instead or in addition to outsiders voting on the best comments, the watchers themselves could just select their most winning comments. This post-production "winnowing" or "cleaning-up" process, would also make being recorded less stressful than it might otherwise be. However, to avoid the inconvenience as well as the discomfort of watch party members having to edit one another, the system as a default could use natural language processing and sentiment analysis to determine which comments the other party or parties, most reacted to, discussed, or liked, and as a default, or as a starting point, just be including those. Similarly, this method could serve as the basis for simply collating all of these junctures to be watched after the video, to avoid interruption during the video (especially for first-time viewers) and as a type of highlight reel or "supercut."

In addition, in some embodiments, the user reactions can also comprise any of user body motions, user sounds, user physiological parameters, and user environment olfactory data. Further, when said video media comprises a video game, the user reactions can also comprise user video game parameters.

When the video media is a video game or virtual reality setting, rather than a more conventional video, additional options are possible. Here the user's location and behavior in the video game or virtual reality settings also are valid user response data, and can also be captured by the system and stored in SRT files.

For example, the user's virtual-world location, video game avatar's bodily movements and limb positions, can also be captured. This enables other users, while replaying the video game or experiencing the virtual reality setting, to enact various behaviors such as to almost literally walk in another user's footsteps, and retrace their path. In addition, detection of other user reactions could form self-standing video game parameters. For instance, users could be awarded points for accurately interpreting other users facial expressions, micro-expressions, or partial facial expressions (e.g., using only the expressive user's eye region expressiveness, and not their entire facial expressiveness). Accuracy could be determined either automatically (using artificial intelligence combined with general data or that own user's data) or manually (through the expressive user scoring the detection accuracy). A given watch party user might, thus, be awarded points and/or build a reputation and following, on the basis of their uncanny empathic, and emotion detection, abilities with respect to their friends and/or with respect to similar or dissimilar strangers.

Spontaneous watch parties: In some embodiments, users can choose to list their status (presently online, or scheduled online status) and make this online status available to at least some other users. Thus, a user wishing to participate on a spontaneous online watch session can include searches for other user present online or scheduled online status, and quickly form new watch parties with those compatible other users that are presently available. Watch party excisions and inter watch partiers direct messaging: By whatever means of mutual agreement, the system could allow "off the record" commenting, in real time, or blotting of comments after the recording is completed for whatever duration. Similarly, especially for large parties, sub-parties of some sort might be desired. Thus, as in a real party people break off and have their own conversations, the system could allow pairs, or small groups, to break off into their own conversation. These conversations might be entirely private. However, the system could also for them to be made to more closely resemble the real world, and for these conversations to be semipublic, so that people can see who is talking to who, and perhaps, using an algorithm can "eavesdrop" (e.g., listen for a limited duration, see certain facial expressions, hear certain phrases words), and on that basis can know whether or not they want to ask to join the conversation, which the system can then permit them to do as well. While the system can allow otherwise, by default any private or semi-private conversations, would not be recorded, and not be part of the srt.

The invention claimed is:

1. A computer-implemented method of sharing user reactions relating to specific video media, said method comprising:
receiving, by a server, user information associated with a plurality of users, each user information comprising an activity-based disclosure condition comprising a defined video media identifier for a defined video media, user demographics, and user reactions on said defined media defined by said defined video identifier;
wherein, for each user, said user reactions comprise any of text, audio, user motion, user physiological status changes, user environmental data, or video comments that correspond to various time stamps in the defined video media associated with said defined video identifier, thus allowing said user reactions to be synchronized with said defined video media;
storing said defined video media identifiers, user demographics, and user reactions in a database;
receiving search parameters from at least one user according to any of said defined video media identifiers, user demographics, and user reactions, and using said database to output any of those video media identifiers, user demographics, or user reactions that match said search parameters, thereby producing suggested matches, and transmitting said suggested matches to said at least one user;
receiving at least one approved match from said at least one user, said at least one approved match selected from said suggested matches;
for each defined video identifier selected by both said at least one user and by at least one approved matching user, producing a combined set of user reactions that incorporates at least some of user reactions selected from said at least one approved matching user sorted, within an adjustable time parameter, according to said time stamps of said user reactions;
and outputting at least some user reactions from said combined set of user reactions.

2. The method of claim 1, further obtaining, using any of said server or other computerized device, said defined video media specified by said defined video identifier, and using at least one computer processor and at least one video display screen to play back said defined video media and said combined set of user reactions to at least one user.

3. The method of claim 2, wherein at least some of said user reactions are displayed in a form of an avatar of at least some users.

4. The method of claim 1, wherein said user reactions are transmitted from said server to at least one other computerized device with non-transient memory, and stored in said non-transient memory according to any of a SRT or general-SRT file structure.

5. The method of claim 1, wherein said server is configured to enable other users to vote on said user reactions, and wherein said server outputs either the results of said vote or a statistical summary of the results of said vote.

6. The method according to claim 1, wherein at least some said search parameters can be stored in memory for future reuse, and wherein said search parameters include one or more of other user networks, other user present online or scheduled online status, other user demographics, differences between said user demographics and said other user demographics, other user video media preferences, other user scheduled watch queues of video media to watch in the future, and at least one parameter derived from a history of other user reactions.

7. The method of claim 1, wherein said user demographics comprises one or more of the group consisting of: a username, a name, an age, a school attended, a degree obtained, a skill, a hobby, a habit, a birthplace, a current residence, a previous residence, a current location, a historical location, an employer, a family member, a strength, a weakness, a goal, a content preference, days and times of availability, interest in people watching, celebrity or expert for hire status and voluntarily disclosed medical information.

8. The method of claim 1, wherein said plurality of users comprise at least a first user and a second user, further comprising receiving, by the server, from the second user, a review of the first user; and associating, by the server, said review with the first user;

and transmitting, using said server, any of said reviews and statistical summaries of said reviews to other computerized devices.

9. The method of claim 1, further using said defined video media identified by said defined video media identifier, and said combined set of user reactions, to produce any of a user commented video media or a user commented subset of said video media.

10. The method of claim 1, further, during a playback of said defined video media, using any of said server and other computerized device to merge said combined set of user reactions with real-time user reactions, and transmitting, using any of said server and said other computerized device, a combination of said defined video media, said combined set of user reactions, and real-time user reactions.

11. The method of claim 1, wherein said server is configured to save a record of a set or subset of users providing user reactions for a specific media as a "watch party", and searching, using said server, for past or scheduled future instances of user reactions by said watch party.

12. The method of claim 1, wherein said user reactions comprise user comments, further translating, using said server, said user comments from either a first language to a second language, or transcribing audio user comments to either written user comments or sign language user comments.

13. The method of claim 1, wherein said user reactions comprise any of user body motions, user sounds, user physiological parameters, and user environment olfactory data; and when said video media comprises any of a video game or virtual reality setting, user video game parameters or virtual reality parameters.

14. The method of claim 13, wherein any of said user body motions, user physiological parameters, user sounds and user environment olfactory data are automatically chosen to be indicative of user emotional state, and are automatically reported as an indicia of user emotional state.

15. The method of claim 1, wherein said user can designate at least some of their user reactions as being any of confidential to some or all other users, time limited, or playback number limited.

16. The method of claim 1, wherein outputting at least some user reactions from said combined set of user reactions can comprise any of:
a) at least some of said user reactions comprise other user motions, and said outputting comprises reproducing at least some of said other user motions using at least one haptic device;
b) at least some of said user reactions comprise other user motions, and said outputting comprises reproducing at least some of said other user motions on an avatar of said other user;
c) automatically varying both the speed of said video media and the speed of said user reactions synchronized to said video media according to at least one user selected parameters.

17. The method of claim 1, wherein and outputting at least some user reactions from said combined set of user reactions can be selected by each user according to any of other user identity, type of user reaction, and video section; and/or
wherein a user may designate a section of a video as being of particular interest and request reactions by other users.

18. The method of claim 1, wherein at least some of said user reactions comprise verbal comments or other sounds, wherein outputting at least some user reactions from said combined set of user reactions further comprises varying a volume of said verbal comments or sounds according to at least one user selected parameter.

19. The method of claim 1, wherein at least some of said user reactions comprise text comments, wherein outputting at least some user reactions from said combined set of user reactions further comprises changing a graphical representation of said text comments according to at least one user selected parameter.

20. The method of claim 1, wherein said user reactions are transmitted from said server to at least one other computerized device with non-transient memory, and stored in said non-transient memory according to any of a SRT or general-SRT file structure; and
subsequently editing said SRT or general SRT file structure to add or subtract or otherwise modify any of said user reactions.

* * * * *